US007650263B2

(12) United States Patent
Boyd et al.

(10) Patent No.: US 7,650,263 B2
(45) Date of Patent: Jan. 19, 2010

(54) METHOD FOR FAST COMPUTATION OF OPTIMAL CONTACT FORCES

(75) Inventors: Stephen P. Boyd, Stanford, CA (US); Eliot Leonard Wegbreit, Palo Alto, CA (US)

(73) Assignee: Strider Labs, Inc., Palo Alto, CA (US)

( * ) Notice: Subject to any disclaimer, the term of this patent is extended or adjusted under 35 U.S.C. 154(b) by 342 days.

(21) Appl. No.: 11/527,897

(22) Filed: Sep. 26, 2006

(65) Prior Publication Data

US 2008/0077361 A1    Mar. 27, 2008

(51) Int. Cl.
  G06F 17/50    (2006.01)
  B66C 1/00    (2006.01)
(52) U.S. Cl. .............................. 703/2; 703/7; 702/189; 706/46; 706/47; 706/48; 294/106
(58) Field of Classification Search .................... 703/2, 703/4, 5, 7; 702/189; 706/46–48; 294/106
See application file for complete search history.

(56) References Cited

U.S. PATENT DOCUMENTS

2005/0049990 A1*  3/2005  Milenova et al. .............. 706/48
2006/0012198 A1*  1/2006  Hager et al. ................. 294/106

OTHER PUBLICATIONS

Arkadi Nemirovski, "Lecture Notes: Interior Point Polynomial Time Methods in Convex Programming", Georgia Institute of Technology School of Industrial and Systems Engineering, Spring Semester 2004.
Gunter Wohlke, "Grasp Planning & Force Computation for Dextrous Object Manipulation with Multi-Finger Robot Hands", International Computer Science Institute, Technical Report TR-94-018(revised version), Aug. 1994.
Jeffrey Kerr et al., "Analysis of Multifingered Hands", The International Journal of Robotics Research, Winter 1986, vol. 4, No. 4, 1986 Massachusetts Institute of Technology.
David Kirkpatrick et al., "Quantitative Steinitz's Theorems with Applications to Multifingered Grasping", Courant Institute of Mathematical Sciences, Sep. 17, 1991, New York University, New York.
Miguel Sousa Lobo et al., "Applications of Second-order Cone Programming", Jan. 31, 1998.
H. D. Mittelmann, "An Independent Benchmarking of SDP an SOCP Solvers", Digital Object Identifier, Math Program. Series B, Mar. 27, 2001 and Apr. 5, 2002, Springer-Verlag 2002.

(Continued)

*Primary Examiner*—Thai Phan
(74) *Attorney, Agent, or Firm*—Gard & Kaslow LLP

(57) ABSTRACT

A method for rapidly determining feasibility of a force optimization problem and for rapidly solving a feasible force optimization problem is disclosed. The method comprises formulating the force optimization problem or force feasibility problem as a convex optimization problem, formulating a primal barrier subproblem associated with the convex optimization problem, and solving the primal barrier subproblem. The method and related methods may also be used to solve each problem in a set of force optimization problems, determine the minimum or maximum force required to satisfy any of a set of force optimization problems, solve a force closure problem, compute a conservative contact force vector, or solve a feasible force optimization problem with bidirectional forces.

38 Claims, 3 Drawing Sheets

OTHER PUBLICATIONS

Meyer A. Nahon et al., "Real-Time Force Optimization in Parallel Kinematic Chains under Inequality Constraints", IEEE Transactions on Robotics and Automation, Aug. 1992, vol. 8, No. 4, pp. 439-450.

Antonio Bicchi et al., "Robotic Grasping and Contact: A Review", IEEE International Conference on Robotics and Automation, 2000, vol. 1, pp. 348-353.

Martin Buss et al., "Dextrous Hand Grasping Force Optimization", IEEE Transaction on Robotics and Automation, Jun. 1996, vol. 12, No. 3, pp. 406-418.

Martin Buss et al., "Dikin-Type Algorithms for Dextrous Grasping Force Optimization", The International Journal of Robotics Research, Aug. 1998, vol. 17, No. 8, pp. 831-839, 1998 Sage Publications, Inc.

Fan-Tien Cheng et al., "Efficient Algorithm for Optimal Force Distribution-The Compact-Dual LP Method", IEEE Transactions on Robotics and Automation, Apr. 1990, vol. 6, No. 2, pp. 178-187.

Nancy S. Pollard, "Synthesizing Grasps from Generalized Prototypes", Artificial Intelligence Laboratory, Massachusetts Institute of Technology.

Carlo Ferrari et al., "Planning Optimal Grasps", Proceedings of the 1992 IEEE International Conference on Robotics and Automation Nice, France-May 1992, pp. 2290-2295.

Li Han et al., "Grasp Analysis as Linear Matrix Inequality Problems", IEEE Transactions on Robotics and Automation, Dec. 2000, vol. 16, No. 6, pp. 663-674.

Constant Remond et al., "A Multi-fingered Hand Control Structure with On-line Grasping Force Optimization", Laboratory of Instruments and Systems, Pierre and Marie Curie University.

Marek Teichmann et al., "Probabilistic Algorithms for Efficient Grasping and Fixturing", 1995.

Nancy S. Pollard, "Quality-Preserving Algorithms for Grasp Synthesis from Prototypes", IEEE Transactions of Robotics and Automation Regular paper (to appear), Artifical Intelligence Laboratory, Massachusetts Institute of Technology.

B. Mishra, "Grasp Metrics: Optimality and Complexity", Courant Institute, New York University, NY, USA.

Uwe Helmke et al., "Quadratically Convergent Algorithms for Optimal Dextrous Hand Grasping", IEEE Transactions on Robotics and Automation, Apr. 2002, vol. 18, No. 2, pp. 138-146.

Ch. Borst et al., "Grasp Planning: How to Choose a Suitable Task Wrench Space", German Aerospace Center-DLR, Institute for Robotics and Mechatronics, Germany.

Gerrit Farber et al., "Fast on-line determination of quasi-optimal grasp configurations based on off-line analysis and parametrization on the wrist position", Institute of Organization of Control Systems Industrial, Polytechnic University of Catalunya.

Mark D. Hanes et al., "Neural Network Control of Force Distribution for Power Grasp", Proceedings of the IEEE International Conference on Robotics and Automation, Apr. 7-12, 1991, pp. 746-751, Sacramento, California.

Dennis W. Hong, "Contact Force Distribution for Robotics Hand Grasping", Virginia Tech, Blacksburg, Virginia.

Zexiang Li et al., "Task-Oriented Optimal Grasping by Multifingered Robot Hands", IEEE Journal of Robotics and Automation, Feb. 1988, vol. 4, No. 1, pp. 32-44.

Yun-Hui Liu, "Qualitative Test and Force Optimization of 3-D Frictional Form-Closure Grasps Using Linear Programming", IEEE Transaction on Robotics and Automation, Feb. 1999, vol. 15, No. 1, pp. 163-173.

Yun-Hui Li et al., "Qualitative Test and Force Optimization of 3D Frictional Force-Closure Grasps Using Linear Programming", Proceedings of the 1998 IEEE International Conference on Robotics & Automation Leuven, Belgium-May 1998, pp. 3335-3340.

Xuedong Chen et al., "Optimal Force Distribution for the Legs of Quadruped Robot", Machine Intelligence & Robotic Control, 1999, vol. 1, No. 2, pp. 87-94, 1999 Cyber Scientific.

Guanfeng Liu et al., "Real-Time Grasping-Force Optimization for Multifingered Manipulation: Theory and Experiments", IEEE/ASME Transactions on Mechatronics, Mar. 2004, vol. 9, No. 1, pp. 65-77.

Youshen Xia et al., "Grasping-Force Optimization for Multifingered Robotic Hands Using a Recurrent Neural Network", IEEE Transactions on Robotics and Automation, Jun. 2004, vol. 20, No. 3, pp. 549-554.

Stephen Boyd et al., "Convex Optimization", 2004, Cambridge University Press 2004, Cambridge, United Kingdom.

* cited by examiner

METHOD FOR FAST COMPUTATION OF OPTIMAL CONTACT FORCES

BACKGROUND OF THE INVENTION

1. Field of the Invention

The present invention relates generally to the computation of contact forces and, more particularly, to the computation of optimal contact forces with friction.

2. Description of the Prior Art

The present invention is concerned with mechanisms having closed kinematic chains involving multiple frictional contacts between an actively controlled structure and an object. In such situations, an important problem is choosing an optimal distribution of contact forces to achieve some objective. One example is grasping by a robotic hand, where the kinematic chains are closed through the object grasped. Another example is cooperating manipulators, where the kinematic chains are closed through the load. A third example is multi-legged vehicles, where the kinematic-chains are closed through the terrain.

The issues may be illustrated by considering grasping by a robotic hand, where the problem is choosing a set of contact forces used to grasp an object. A survey of robotic grasping may be found in Bicchi and Kumar, "Robotic grasping and contact: A review", *IEEE International Conference on Robotics and Automation (ICRA)*, pp 348-353, 2000.

The most basic requirement is the ability to restrain an object against a specified external wrench, for example that due to gravity. An early paper discussing this issue is Kerr and Roth, "Analysis of multifingered hands", *The International Journal of Robotic Research*, 4(4): 3-17, 1986. There may be many possible choices that achieve equilibrium. A good choice is one with minimum force, as measured by some function of the contact forces. Various formulations of the problem use various specific functions, as described below. The problem of finding a set of optimal forces is referred to as the "force optimization problem" or "FOP".

A related problem is the ability to resist an arbitrary external wrench. This is called "force closure". This is discussed in Kirkpatrick et al. "Quantitative Steinitz's theorems with applications to multifingered grasping", *Proceedings of the 20th ACM Symposium on Theory of Computing*, pages 341-351, 1990 and in Ferrari and Canny, "Planning optimal grasps, *Proceedings of the 1992 IEEE International Conference on Robotics and Automation*, pages 2290-2295, Nice, France, May 1992.

There are several other related problems. One is finding the minimum over a set of related force optimization problems. For example, this arises when choosing a desirable grasp configuration on an object. A FOP is solved for each grasp configuration and the overall computation finds the configuration with the minimum grasping force.

Another related problem is finding the maximum over a set of related force optimization problems. For example, this arises when finding the maximum grasping force that is required to move an object along a given trajectory. Each point on the trajectory has an associated external wrench and the computation finds the maximum grasping force over the set of external wrenches.

The basic force optimization problem has been studied for several years. Kerr and Roth, supra., was an early work in this area. Another early paper is Cheng and Orin, "Efficient Algorithms for Optimal Force Distribution, the Compact Dual LP Method", *IEEE Trans. on Robotics and Automation*, 6(2): pp. 178-187, April 1990. In both of these papers, the FOP is formulated (approximately) as a linear programming problem (LP), by approximating the friction force limit constraints as linear inequalities.

The force optimization problem was formulated as a quadratic programming problem in a paper by Nahon and Angeles, "Real-Time Force Optimization in Parallel Kinematic Chains under Inequality Constraints", *IEEE Trans. on Robotics and Automation*, 8(4), pp 439-450, August 1992. In that paper, the friction force limit are approximated by linear inequalities, but the objective function is that of minimizing the internal force, a quadratic function of the contact forces. An application of quadratic programming to a legged vehicle is described in Chen, et al, "Optimal Force Distribution for the Legs of a Quadruped Robot, *Machine Intelligence & Robotic Control*, Vo. 1., No. 2, pp 87-94, 1999.

In the late 1990s, several exact formulations of the FOP were obtained by expressing it as a convex optimization problem. One such paper is Buss et al, "Dexterous hand grasping force optimization, "*IEEE Trans. Robotics and Automation*, 12:406-418, June 1996; see also Buss, et al, "Dikin-type algorithms for dexterous grasping force optimization", *International Journal of Robotics Research*, 17(8): pp. 831-839, 1998, and U. Helmke, et al. "Quadratically convergent algorithms for optimal dexterous hand grasping", *IEEE Trans. on Robotics and Automation*, 18:138-146, April 2002.

Particular formulations of convex optimization problem involve matrix inequalities or second-order cone inequalities. The paper by Han et al, "Grasp analysis as linear matrix inequality problems", *IEEE Trans. on Robotics and Automation*, 16:663-674, December 2000, expresses the FOP using (linear) matrix inequalities, so the resulting optimization problem is a "semidefinite programming problem" or "SDP". The FOP is formulated as a "second-order cone problem" or "SOCP" in Lobo et al, "Applications of second-order cone programming", *Linear Algebra and its Applications*, 284: 193-228, November 1998.

These formulations reduce the problem to a standard convex optimization problem. Hence, the problems can be solved by a variety of methods for nonlinear convex optimization developed in the 1990s. The text by Boyd and Vandenberghe, *Convex Optimization*, Cambridge University Press, 2004, describes several such methods. General-purpose software packages for solving an LP, SOCP, and SDP are now widely available. The paper Mittelmann, "An independent benchmarking of SDP and SOCP solvers", *Mathematical Programming, Series B*, 95:407-430, 2003 gives comparative benchmarking of some of these software packages.

Limitations of the Prior Art

There is still, however, a need for faster methods for solving the force optimization problem. Certain real-time applications present such a requirement. The need to solve a large number of force optimization problems presents another requirement. For example, consider the problem of optimizing the position and orientation of a manipulator, relative to an object, using the minimum force required to grasp the object as the objective. This is the (nonconvex) problem of optimizing the contact points at which to grasp a given object. This can be done using an outer search loop that generates candidate manipulator positions and orientations; for each candidate, it is necessary to find the resulting contact points, and then solve the associated FOP to determine the minimum force required to grasp the object. Such an algorithm can require the solution of hundreds of force optimization problems. Other examples are described below.

Hence, there is a need for a system and method able to solve the force optimization problem and related problems very rapidly.

SUMMARY

The present invention provides a method for rapidly determining feasibility of a force optimization problem, by formulating the force feasibility problem as a convex optimization problem, formulating a primal barrier subproblem associated with the convex optimization problem, and solving the primal barrier subproblem.

In an alternative embodiment, a method is provided for rapidly solving a feasible force optimization problem, by formulating the feasible force optimization problem as a convex optimization problem, and determining a solution by formulating a primal barrier subproblem associated with the convex optimization problem, and solving the primal barrier subproblem.

Similar methods are provided for solving other related problems. For example, the method of the present invention may be used to solve each problem in a set of force optimization problems, by formulating the set of force optimization problems problem as a set of convex optimization problems, solving one or more of the convex optimization problems in the set so that a solution state is obtained for each solved problem, retaining one or more of the solution states; and using one of the retained solution states as a starting point in solving subsequent convex optimization problems in the set.

Similar methods are provided for determining the minimum or maximum force required to satisfy any of a set of force optimization problems, solving a force closure problem, computing a conservative contact force vector, or solving a feasible force optimization problem with bidirectional forces.

DETAILED DESCRIPTION

Figure 1:
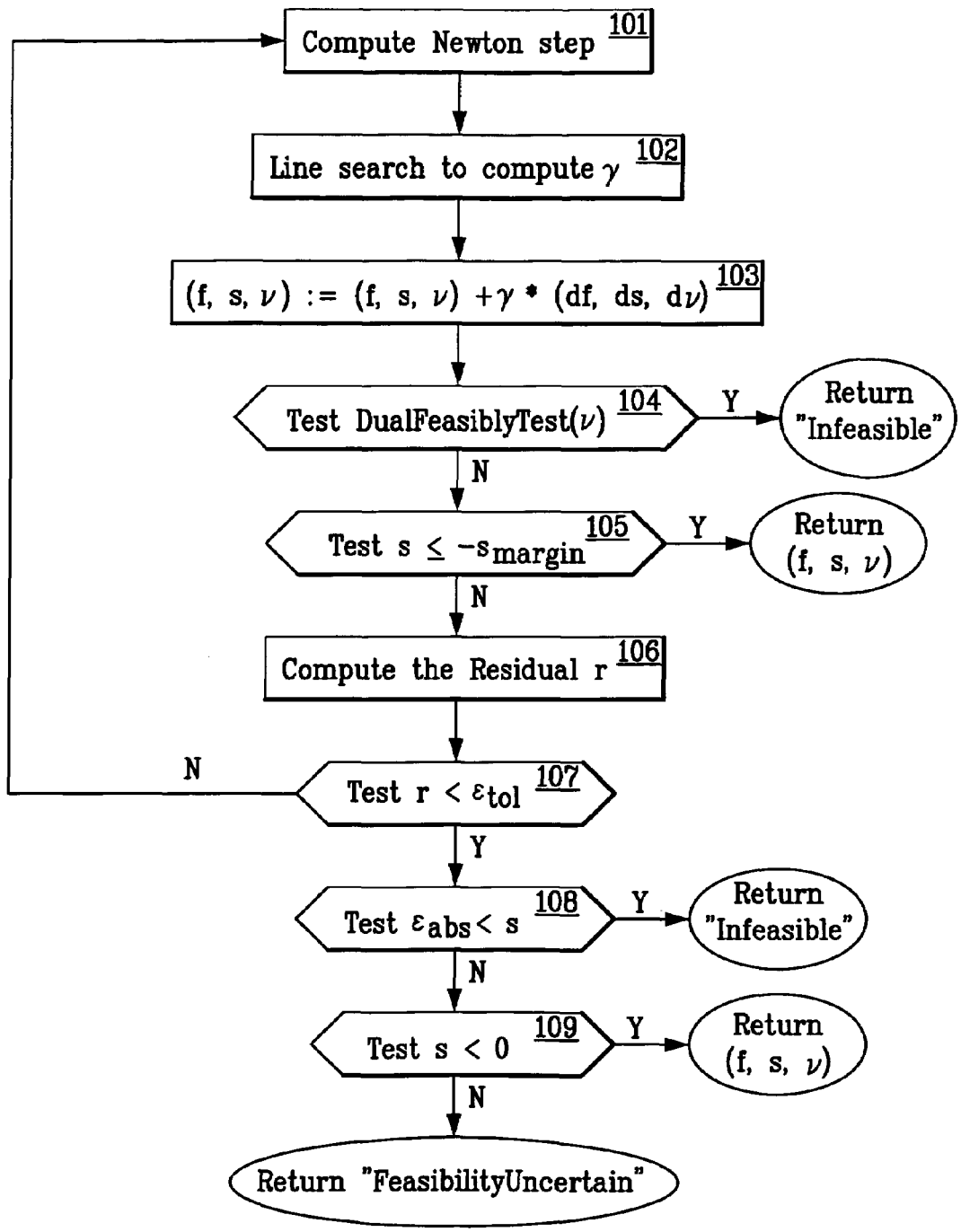
FIG. 1 is a schematic drawing showing the main steps of computing a feasible contact force vector according to an embodiment of the invention.

Briefly described, the invention is a method for solving the force optimization problem and related problems that is substantially faster than the normal method for solving second-order programs. Its termination is entirely nonheuristic. When the problem is feasible, the method terminates with a provable bound on the suboptimality of the computed contact forces. When the problem is infeasible, the method terminates with a certificate that proves the infeasibility of the problem. The method employs multiple novel techniques, as described below.

There are various embodiments of the present invention. It is convenient to describe the invention in the following order: principles of the invention, first through eighth embodiments, and various alternative embodiments. Choosing among the embodiments will be based in part on the application.

PRINCIPLES OF THE INVENTION

Background and General Description

It is convenient to begin with notation. The set of real numbers is denoted by R, the set of real n-vectors by $R^n$, and the set of real m×n matrices by $R^{m \times n}$. The notation (a, b, c) is used to denote a column vector with components a, b, and c. This is also written as $$\begin{bmatrix} a \\ b \\ c \end{bmatrix}$$

When a, b, and c are reals, this is a vector in $R^3$. The same notation is used when a, b, and c are themselves column vectors, in which case (a, b, c) is the column vector obtained by stacking the vector a on top of b on top of c. The Euclidean norm of the vector (a, b, c) is denoted as $\|(a, b, c)\|$.

Contact Models and Coordinate Systems

A rigid object is in contact at M points, which have positions $p^{(i)} \in R^3$ in the global coordinate system, for i=1, . . . , M. For simplicity of exposition, we will initially use a model of point contact with friction. Other friction models may also be employed in the present invention, e.g., a soft contact point that can exert a torque on the object. Each friction model leads to a different variant of the force optimization problem and related problems. The alternative embodiments describe how the present invention handles other friction models.

In the interest of clarity, we initially assume the normal forces are unidirectional; however, the present invention is able to solve force optimization problems where normal forces are bidirectional. In particular, all of the various embodiments can be applied to bidirectional forces as well as unidirectional forces. The Eighth Embodiment describes how the present invention treats bidirectional forces.

The force applied at contact point $p^{(i)}$ is denoted $f^{(i)}$, where $f^{(i)} \in R^3$. The applied force is given in a local coordinate system, with the x-axis and y-axis tangent to the object surface at $p^{(i)}$, and the z-axis normal to the object surface at $p^{(i)}$ and pointing inward. We denote its components as $f^{(i)} = (f_x^{(i)}, f_y^{(i)}, f_z^{(i)})$. Thus, $f_z^{(i)}$ is the normal (inward) force applied at contact point $p^{(i)}$, and $(f_x^{(i)}, f_y^{(i)})$ is the tangential force applied at contact point $p^{(i)}$.

Friction Cone Constraints

The point contact friction model requires the contact forces to satisfy the so-called "friction cone constraints"

$$\|(f_x^{(i)}, f_y^{(i)})\| = (f_x^{(i)2} + f_y^{(i)2})^{1/2} \leq \mu_i f_z^{(i)} \quad i=1, \ldots, M \quad (1)$$

where $\mu_i > 0$ is the coefficient of static friction at contact point $p^{(i)}$. This is known as Coulomb's law of friction. This constraint states that the magnitude of the tangential force does not exceed the coefficient of static friction times the normal force. In particular, it implies that the normal forces $f_z^{(i)}$ must be nonnegative. The friction cone constraints are so-called "second-order cone constraints". Second-order cone constraints are described in the text Boyd and Vandenberghe, *Convex Optimization*, supra. The vector of the M coefficients of friction, $(\mu_1, \ldots, \mu_M)$ is denoted as $\mu$.

We introduce the "friction cones", $K_1, \ldots K_m$ which are subsets of $R^3$ defined as $$K_i = \{x \in R^3 \mid (x_1^2 + x_2^2)^{1/2} \leq \mu_i x_3\}, \, i=1, \ldots M \quad (2)$$

Using this notation we can express the friction cone constraints (1) compactly as $$f^{(i)} \in K_i, \quad i=1,\ldots M. \tag{3}$$

Equilibrium Constraints

Let $Q^{(i)} \in SO(3)$ be the 3×3 orthogonal matrix that transforms forces in the local coordinate system at $p^{(i)}$ into the global coordinate system. Thus, the force on the object due to the contact force at $p^{(i)}$ is $Q^{(i)}f^{(i)}$ in the global coordinate system. The force equilibrium condition is $$Q^{(1)}f^{(1)} + \ldots + Q^{(M)}f^{(M)} + f^{ext} = 0 \tag{4}$$

where $f^{ext} \in R^3$ is the total external force that acts on the object expressed in the global coordinate system.

The torque applied to the object by the force at contact point $p^{(i)}$ is given by the cross product $$p^{(i)} \otimes Q^{(i)}f^{(i)}$$

expressed in the global coordinate system. The torque equilibrium condition is $$p^{(1)} \otimes Q^{(1)}f^{(1)} + \ldots + p^{(M)} \otimes Q^{(M)}f^{(M)} + \tau^{ext} = 0$$

where $\tau^{ext} \in R^3$ is the total external torque that acts on the object expressed in the global coordinate system. Then we can write the torque equilibrium condition as $$S^{(1)}Q^{(1)}f^{(1)} + \ldots + S^{(M)}Q^{(M)}f^{(M)} + \tau^{ext} = 0 \tag{5}$$

where $$S^{(i)} = \begin{bmatrix} 0 & -p_z^{(i)} & p_y^{(i)} \\ p_z^{(i)} & 0 & -p_x^{(i)} \\ -p_y^{(i)} & p_x^{(i)} & 0 \end{bmatrix} \in skew(3)$$

is the skew-symmetric matrix that satisfies $S^{(i)}f = p^{(i)} \otimes f$.

We now introduce some more compact notation for the equilibrium constraints. We define the "contact force vector" $f \in R^{3M}$ as $$f = (f^{(1)}, \ldots f^{(m)}).$$

This is the vector of all the contact force vectors stacked to form a long column vector. We define the "ith contact matrix" $A_i \in R^{6 \times 3}$ as $$A_i = \begin{bmatrix} Q^{(i)} \\ S^{(i)}Q^{(i)} \end{bmatrix},$$

$$i = 1, \ldots M$$

and the "contact matrix" $A = [A_1 \ldots A_m] \in R^{6 \times 3M}$. We collect the external force and torque into a single external wrench $\omega^{ext} = (f^{ext}, \tau^{ext}) \in R^6$. Note that $\omega^{ext}$ is the total wrench exerted by all influences other than the contact forces. It may be due to gravity, to acceleration, to a magnetic field, other external influences, or a combination of the above. The particular physical phenomena giving rise to the external wrench depend on the application.

Note that $A_i f$ gives the wrench on the object due to the force at contact point $p^{(i)}$, and $Af$ gives the total wrench on the object from all the contact forces. Thus we can write the equilibrium conditions (4) and (5) as $$Af + \omega^{ext} = 0 \tag{6}$$

This is a set of 6 linear equations in the 3 M contact forces f.

Force Optimization Problem

The force optimization problem is to find a set of contact force vectors $f^{(i)}$ that are as small as possible, while satisfying the friction cone constraints (3) and the force and torque equilibrium conditions (6). There are several possible ways in which the "size" of a contact force vector may be measured. Each such measure leads to a variant of the force optimization problem. For simplicity of exposition, we will initially use one particular measure, the maximum contact force. The alternative embodiments describe how the present invention handles other measures, e.g., the sum of the force magnitudes, the sum of the squares of the force magnitudes, or the maximum normal force.

If we measure the size of the set of contact forces by the maximum magnitude of the M contact forces, we use the measure $F^{max}$, defined as $$F^{max} = \max\{\|f^{(1)}\|, \ldots, \|f^{(M)}\|\} \max_{i=1,\ldots,M}(f_x^{(i)2} + f_y^{(i)2} + f_z^{(i)2})^{1/2}$$

then the optimization problem can be expressed as minimize $F^{max}$ subject to $f^{(i)} \in K_i, i=1,\ldots M,$ $$Af + \omega^{ext} = 0 \tag{7}$$

The optimization variable is the contact force vector $f \in R^{3M}$. The problem data consists of the contact matrix A (which describes the geometry of the contact points), $\omega^{ext}$ (the externally applied wrench), and $K_i$ (the friction cones, which depend on problem data $\mu_i$, the coefficients of friction). We denote the optimal value as $F^*$.

This is a particular variant of the force optimiation problem, the variant that uses force measure $F^{max}$. We refer to this problem as the FOP of Equation (7). Other force measures lead to other force optimization problems that may be solved by the present invention.

A force-optimization problem is said to be "feasible" if there is some contact force vector that satisfies the equilibrium conditions and the friction cone constraints of the chosen friction model. Otherwise, a force optimization problem is said to be "infeasible".

We note for future reference that the contact matrix A has rank 6, provided that $M \geq 3$ and the contact points are not collinear. This is readily tested and we assume this to be the case in the discussion that follows.

Conic Formulation

The FOP of Equation (7) can be expressed as a second-order cone program (SOCP), by introducing a new scalar variable F that bounds the magnitude of the contact forces:

minimize F subject to $(f^{(i)}, F) \in K, i=1,\ldots M,$ $f^{(i)} \in K_i, i=1,\ldots M,$ $$Af + \omega^{ext} = 0 \tag{8}$$

Here K denotes the standard second-order cone in $R^4$.

$$K = \{x \in R^4 | (x_1^2 + x_2^2 + x_3^2)^{1/2} \leq x_4\},$$

so $(f^{(i)}, F) \in K$ means $$(f_x^{(i)2} + f_y^{(i)2} + f_z^{(i)2})^{1/2} \leq F$$

In the problem of Equation (8) there are 3 M+1 scalar variables: the elements of the contact force vector $f \in R^{3M}$, and F, the new scalar variable introduced to bound the maximum force magnitude.

The force optimization problem can be formulated in several other ways as a convex optimization problem. In particular, it can be formulated as a semi-definite program (SDP). The SDP formulation is readily derived from the conic formulation of the FOP, by expressing the second-order cone constraints as linear matrix inequalities (LMIs). For example, we can express $f^{(i)} \in K_i$ as the linear matrix inequality $$\begin{bmatrix} \mu_i f_z^{(i)} & 0 & f_x^{(i)} \\ 0 & \mu_i f_z^{(i)} & f_y^{(i)} \\ f_x^{(i)} & f_y^{(i)} & \mu_i f_z^{(i)} \end{bmatrix} \geq 0$$

where $\geq$ denotes matrix inequality. This gives the SDP (or LMI) formulation of the FOP. Also, the friction cone constraints can be approximated by linearization, so the force optimization problem can be approximated by a linear program.

Force Closure

Force closure occurs if for every wrench $\omega \in R^6$, there exists a set of contact forces $f^{(i)} \in K_i$ for which $A f + \omega = 0$. We can describe this condition in terms of cones. Define $$W = \{-Af | f^{(i)} \in K_i\} \quad (9)$$

which is the cone of wrenches that can be resisted. Force closure is equivalent to $W = R^6$.

We can determine force closure by solving a set of FOPs. Let $\omega_1, \ldots, \omega_K \in R^6$ be a set a of wrenches with 0 in the interior of their convex hull, i.e., there exist positive $\lambda_1, \ldots, \lambda_K$ such that $$\lambda_1 \omega_1 + \ldots + \lambda_K \omega_K = 0 \quad (10)$$

The minimum possible value of K is 7. Force closure occurs if and only if each of these wrenches can be resisted, i.e., the associated K FOPs are all feasible.

If any of these FOPs is infeasible, then force closure does not occur. On the other hand, suppose that each of these K FOPs is feasible, with optimal contact force vectors $f_1, \ldots f_K \in R^{3M}$. Given any $\omega \in R^6$, we can write it as a positive linear combination of the vectors $\omega_1, \ldots, \omega_K$, as $$\omega = \beta_1 \omega_1 + \ldots + \beta_K \omega_K, \beta_1, \ldots, \beta_K \geq 0$$

It follows that the contact force vector $$f = \beta_1 f_1 + \ldots + \beta_K f_K,$$

is feasible, i.e., satisfies the friction cone constraints and resists the external wrench $\omega$.

Dual Force Optimization Problem

In this section we derive a dual problem for the particular FOP of Equation (8). For a general reference on Lagrange duality, see the text Boyd and Vandenberghe, *Convex Optimization*, supra. We introduce three sets of Lagrange multipliers: (1) Lagrange multiplier vectors $z_i \in R^3$ for the friction cone constraints; (2) Lagrange multiplier vectors $(u_i, \lambda_i) \in R^4$, with $u_i \in R^3$ and $\lambda_i \in R$, for the constraints involving K; and (3) a Lagrange multiplier vector $v \in R^6$ for the equality constraint. The Lagrangian is $$L(f, F, z, u, \lambda, v) =$$

$$F - \Sigma_{i=1,\ldots,M} z_i^T f^{(i)} - \Sigma_{i=1,\ldots,M} (u_i, \lambda_i)^T (f^{(i)}, F) + v^T (Af + \omega^{ext}) =$$

$$(1 \Sigma_{i=1,\ldots,M} \lambda_i) F - \Sigma_{i=1,\ldots,M} (z_i + u_i - A_i^T v)^T f^{(i)} + v^T \omega^{ext} \quad (11)$$

To obtain the dual function, we minimize L over the primal variables F and f. When we minimize L over F, we find that the minimum is $-\infty$, unless $\Sigma_{i=1,\ldots,M} \lambda_i = 1$. Minimizing L over $f^{(i)}$ yields $-\infty$ unless $A_i^T v = z_i + u_i$ for $i = 1, \ldots, M$. The dual function is therefore given by $$g(z, u, \lambda, v) =$$

$$\inf_{f, F} L(f, F, z, u, \lambda, v) =$$

$$\begin{bmatrix} v^T \omega^{ext} & \text{if } \sum_{i=1,\ldots,M} \lambda_i = 1 \text{ and } A_i^T v = z_i + u_i, \text{ for } i = 1, \ldots, M \\ -\infty & \text{otherwise} \end{bmatrix}$$

Thus, we can write the dual of the FOP (see, e.g., Boyd and Vandenberghe) as maximize $v^T \omega^{ext}$ subject to $z_i \in K_i^*$, $i = 1, \ldots M$ $(u_i, \lambda_i) \in K^*$, $i = 1, \ldots M$ $\Sigma_{i=1,\ldots,M} \lambda_i = 1$ $A_i^T v = z_i + U_i$, $i = 1, \ldots, M,$ with the optimization variables $z$, $u$, $\lambda$, and $v$. $K^*$ denotes the dual of the standard second-order cone in $R^4$. $K_i^*$ denotes the dual of the friction cone $K_i$. The standard second-order cone is self dual, that is $K^* = K$. The dual friction cones are given by $$K_i^* = \{y \in R^3 | y_1^2 + y_2^2\}^{1/2} \leq y_3 / \mu_i\}, i = 1, \ldots M \quad (12)$$

(This follows from the general fact that for any cone K and any nonsingular matrix C, we have $(C K)^* = C^{-T} K^*$.)

We can considerably simplify the basic Lagrange dual problem above, by eliminating all variables except $v \in R^6$. Note that $(u_i, \lambda_i) \in K^* = K$ is the same as $\|u_i\| \leq \lambda_i$. Hence, we can eliminate the variables $\lambda_i$ and express the dual as maximize $v^T \omega^{ext}$ subject to $z_i \in K_i^*$, $i = 1, \ldots M$ $\Sigma_{i=1,\ldots,M} \|u_i\| \leq 1$ $A_i^T v = z_i + u_i$, $i = 1, \ldots, M,$ We now eliminate the variables $u_i$, using $u_i = A_i^T v - z_i$, to obtain maximize $v^T \omega^{ext}$ subject to $z_i \in K_i^*$, $i = 1, \ldots M$ $\Sigma_{i=1,\ldots,M} \|A_i^T v - z_i\| \leq 1 \quad (13)$ Finally, we eliminate the variables $z_i$. The optimal $z_i$ in the problem above is the one that minimizes $\|A_i^T v - z_i\|$ over $z_i \in K_i^*$, i.e., the Euclidean projection of $A_i^T v$ onto $K_i^*$:

$$z_i = P_{K_i^*}(A_i^T v),$$

and the associated minimum value is $$\min_{z_i \in K_i^*} \|A_i^T v - z_i\| = \text{dist}(A_i^T v, K_i^*)$$

which is the distance from $A_i^T v$ to the dual cone $K_i^*$. Thus, we can write the dual FOP as maximize $v^T \omega^{ext}$ subject to $\Sigma_{i=1,\ldots,M} \text{dist}(A_i^T v, K_i^*) \leq 1$ (14)

with variables $v \in R^6$.

We can give an explicit formula for the projection of a point $(x, y)$, with $x \in R^2$ and $y \in R$, onto the cone $K_i^*$. To do so, observe that the cone $K_i^*$ is symmetric about its third axis. It follows that we can rotate $(x, y)$ to a vector with the second component of x zero. This means we really have a problem with $x \in R$ and $y \in R$. To project $(x, y) \in R^2$ onto $K_i^*$, there are three cases. If $(x, y)$ is in the dual cone, the projection is $(x, y)$ and the distance is zero. If $(x, y)$ is in the negative of the cone K, the projection is $(0, 0)$ and the distance is $\|(x, y)\|$. Otherwise, the projection is the point w on the edge of the dual cone for which $w - (x, y)$ is orthogonal to the edge of the cone. Assume that $x > 0$. Then $w = (\sigma, \sigma \mu_i)$ for some $\sigma > 0$. We can find a using the orthogonality condition. From this it follows that $$P_{K_i^*}(x, y) = \begin{bmatrix} (x, y) & \text{if } y \geq \mu_i \|x\| \\ \beta * (x, \mu_i \|x\|) & \text{if } -\|x\|/\mu_i \leq y \leq \mu_i \|x\| \\ 0 & \text{if } y \leq -\|x\|/\mu_i \end{bmatrix}$$

where the scalar $\beta$ is defined as $$\beta = (\mu_i y + \|x\|)/((1 + \mu_i^2)\|x\|)$$

The corresponding distance is given by $$\text{dist}((x, y), K_i^*) = \begin{bmatrix} 0 & \text{if } y \geq \mu_i \|x\| \\ (\mu_i \|x\| - y)/(1 + \mu_i^2)^{1/2} & \text{if } -\|x\|/\mu_i \leq y \leq \mu_i \|x\| \\ \|(x, y)\| & \text{if } y \leq -\|x\|/\mu_i \end{bmatrix}$$ (15)

This gives us an explicit formula for $\text{dist}(A_i^T v, K_i^*)$. Hence the dual given by Equation (14) is completely explicit.

Recall that the optimal value of the primal FOP of Equation (7), or equivalently Equation (8), is denoted by $F^*$. The dual force optimization problem of Equation (14) satisfies the following properties. (Details may be found in Boyd and Vandenberghe, *Convex Optimization*, supra.)

(1) Weak duality. Suppose v is "dual feasible", i.e., $\Sigma_{i=1,\ldots,M} \text{dist}(A_i^T v, K_i^*) \leq 1$. Then the dual objective value $v^T \omega^{ext}$ is a lower bound on $F^*$, where $F^*$ is the optimal value of the primal FOP of Equation (7).

(2) Strong duality. Suppose the primal FOP (8) is "strictly feasible", i.e., there exists (f, F) with $Af + \omega^{ext} = 0$, $(f^{(i)}, F) \in$ interior K, and $f^{(i)} \in$ interior $K_i$ for all $i = 1, \ldots, M$. Then there exists a dual feasible $v^*$ for which $v^{*T} \omega^{ext} = F^*$. In fact, $v^*$ is optimal for the dual FOP of Equation (14).

Since the dual objective value v Text and the dual constraint function $\Sigma_{i=1,\ldots,M} \text{dist}(A_i^T v, K_i^*)$ are both homogeneous, we can scale any v for which $\Sigma_{i=1,\ldots,M} \text{dist}(A_i^T v, K_i^*) \neq 0$ so that $\Sigma_{i=1,\ldots,M} \text{dist}(A_i^T v K_i^*) = 1$. Hence, the dual objective value $F_{dual}$ is given by $$F_{dual} = (v^T \omega^{ext})/\Sigma_{i=1,\ldots,M} \text{dist}(A_i^T v, K_i^*)$$ (16)

which is valid for any v such that $\Sigma_{i=1,\ldots,M} \text{dist}(A_i^T v, K_i^*) \neq 0$. $F_{dual}$ is a lower bound, i.e. $F_{dual} \leq F^*$.

The explicit Equation (16) for the dual objective value is computationally significant. As described below, it is used by the invention to facilitate the solution of the original FOP. The invention thereby obtains a computational advantage compared to methods that do not have an explicit formula for the dual objective value.

Sensitivity Interpretation

The optimal dual variable $v^*$ is useful as a measure of the sensitivity of the optimal contact force with respect to changes in the external wrench. Assuming that $F^*$ is a differentiable function of $\omega^{ext}$ (which is not always the case), we have $$\partial F^*/\partial \omega_i^{ext} = v_i^*$$

For example, $v_i^*$ gives us (approximately) the change in minimum required contact force, per unit of increase in the first component of the externally applied wrench.

If $v^*$ is large, small changes in an externally applied wrench can lead to large changes in the minimum required contact force. This is a property of the set of contact locations. It indicates that, with these locations, the contact forces are sensitive to the external wrench. In many applications, this is indicative of an undesirable set of locations.

Infeasibility Conditions

The FOP (7) is feasible when there exists a contact force vector f that satisfies the friction cone and equilibrium constraints, i.e., $$f^{(i)} \in K_i, i = 1, \ldots M, Af + \omega^{ext} = 0$$ (17)

which is a set of M second-order cone constraints and 6 linear equality constraints. The associated set of "alternative constraints" give the conditions under which (17) is infeasible:

$$A_i^T v \in K_i^*, i = 1, \ldots M \; \epsilon^T \omega^{ext} > 0$$ (18)

which is a set of M second-order cone constraints for the dual variable $v \in R^6$. The condition of Equations (17) and (18) are strong alternatives: For any problem data, exactly one of them is feasible. Thus, feasibility of either set of conditions implies infeasibility of the other set of conditions. For further details, see Boyd and Vandenberghe, *Convex Optimization*, supra.

It is easy to verify weak duality, i.e., that conditions (17) and (18) cannot both be feasible. If they were both feasible, say with f and v, then we would have $$0 = v^T(Af + \omega^{ext}) = \Sigma_{i=1,\ldots,M}(A_i^T v)^T f^{(i)} + v^T \omega^{ext} > 0,$$

since $A_i^T v \in K_i^*$ and $f^{(i)} \in K_i$ imply $(A_i^T \epsilon)^T f^{(i)} > 0$.

The infeasibility conditions (18) are closely related to the dual FOP of Equation (14). If v satisfies the alternative constraints (18), then for any $\alpha > 0$, $\alpha v$ is feasible for the dual problem (14), since $\text{dist}(A_i^T(\alpha v), K_i^*) = 0$. Therefore, $\alpha v^T \omega^{ext}$ is a lower bound on $F^*$, for any $\alpha > 0$. Since this can be made arbitrarily large, we must have $F^* = \infty$, i.e., the FOP (7) is infeasible.

Force Non-Closure

We can now similarly give necessary and sufficient conditions for the absence of force closure. This is the condition that the FOP is infeasible for some external wrench. By the results above, this is equivalent to:

$$A_i^T v \in K_i^*, i=1, \ldots M \quad v \neq 0 \quad (19)$$

Given such a $v$, we can easily construct an external wrench that cannot be resisted. For example choose $\omega^{ext}=v$. More generally, a $v$ that satisfies the no-force-closure conditions (19) gives us an entire half space of wrenches that cannot be resisted, i.e., any $\omega^{ext}$ with $v^T \omega^{ext} > 0$.

We also note that $-v$ can be interpreted as a tangent plane, at 0, to the cone W of resistible wrenches defined in (9). That is, for each nonzero $\omega \in W$, we have $v^T \omega \leq 0$. Indeed, $-v \in W^*$, where $W^*$ is the dual of the cone of resistible wrenches. This establishes that force closure fails, since force closure is equivalent to $W^* = \{0\}$.

Barrier Subproblem Associated with the Force Optimization Problem

We next describe and analyze the so-called "primal barrier subproblem" or "barrier subproblem" associated with the FOP of Equation (8). This subproblem arises directly in interior-point methods such as primal barrier methods, including the algorithm we will describe, and also indirectly in all others, e.g., primal-dual methods.

The primal barrier subproblem is minimize $t F + \phi(f, F)$ subject to $Af + \omega^{ext} = 0$, (20)

where $t > 0$ is the so-called "accuracy parameter", and $\phi(f,F)$ is the so-called "log barrier" for the cone constraints. Solving the primal barrier subproblem consists of finding a suitable scalar F and contact force vector f.

The log barrier is given by $$\Phi(f, F) = \sum_{i=1,\ldots,M} \Phi_i(f^{(i)}, F),$$

where $$\Phi_i(f^{(i)}, F) = -\log(F^2 - f_x^{(i)2} - f_y^{(i)2} - f_z^{(i)2}) - \log(\mu_i^2 f_z^{(i)2} - f_x^{(i)2} - f_y^{(i)2})$$

if $\phi_i(f^{(i)},F)$ satisfies the cone constraints strictly, i.e., $(f^{(i)},F) \in$ interior K and $f^{(i)} \in$ interior $K_i$ (21)

and $\phi_i(f^{(i)},F)=\infty$ otherwise. The log barrier is a smooth convex function, so the barrier subproblem is a smooth convex problem. For more on log barriers for convex cones, see Boyd and Vandenberghe, *Convex Optimization*, supra.; see also Nesterov and Nemirovsky. *Interior-point polynomial methods in convex programming*, volume 13 of Studies in Applied Mathematics, SIAM, Philadelphia, Pa., 1994.

In the next section, we will assume the subproblem is feasible, i.e., there exists a point (f,F) that satisfies $Af + \omega^{ext} = 0$ and Constraints (21). This assumption is slightly more than assuming the original FOP (8) is feasible; it means the original FOP is strictly feasible. This assumption can be simplified to the following: There exists $f \in R^{3M}$ that satisfies $Af + \omega^{ext} = 0$ $f^{(i)} \in$ interior $K_i$, i=1, ... M.

(We can always choose F large enough to satisfy the other cone constraints strictly.)

Before getting into details, we mention the most important facts about the barrier subproblem of Equation (20). First, it is a convex optimization problem, with smooth objective and equality constraints, so it can be solved by a variety of techniques, including Newton's method. Second, it gives an approximate solution of the FOP of Equation (8). The solution (f,F) of the barrier subproblem is guaranteed to be at most 4 M/t-suboptimal for the original FOP of Equation (8). That is, if $F^{sol}$ is a solution to the barrier subproblem and $F^*$ is the optimal value of the original FOP then $$F^{sol} - F^* \leq 4M/t$$

Let $\epsilon_{abs}$ be some absolute tolerance to be achieved. If t is chosen such that $t \leq 4 M/\epsilon_{abs}$ then we have the guarantee $$F^{sol} - F^* \leq \epsilon_{abs}$$

Barrier Subproblem Optimality Conditions for the FOP

We consider the conditions for optimality of the barrier subproblem. Suppose (f, F) strictly satisfies the cone constraints, i.e., Equation (21) holds. The so-called "primal residual" is $$r_p = Af + \omega^{ext} \in R^6$$

This is the error in the equilibrium force and torque balance condition.

The so-called "dual residual" is $r_d \in R^{3M+1}$ $$r_d = \begin{bmatrix} r_f \\ r_F \end{bmatrix} = \begin{bmatrix} \nabla_f \Phi(f, F) + A^T v \\ t + \partial \Phi(f, F)/\partial F \end{bmatrix}$$

where $v \in R^6$ is the Lagrange multiplier associated with the equality constraints. Here $r_f \in R^{3M}$ is the component of the dual residual associated with the force contact vector f, and $r_F \in R$ is the component of the dual residual associated with the bounding force F.

We can further divide $r_f$ into components corresponding to the individual contact points, as $r_f = (r^{(1)}, \ldots, r^{(M)})$ $$r^{(i)} = \nabla_{f^{(i)}} \phi_i(f^{(i)}, F) + A_i^T v, i=1, \ldots M$$

Here $r_i \in R^3$ is the portion of the dual residual associated with contact point i. We will give more explicit formulas for these below.

The optimality conditions for the barrier subproblem of Equation (20) can be expressed in terms of the primal and dual residuals as $r_p = 0, r_d = 0$ Details may be found in Boyd and Vandenberghe, *Convex Optimization*, supra.

Dual Feasible Points from Subproblem Solution

If $(f^*, F^*, v^*)$ are optimal for the barrier subproblem, then $v^*/t$ is feasible for the dual FOP of Equation (14). The associated dual objective value is $v^{*T} \omega^{ext}/t$. This satisfies $$v^{*T} \omega^{ext}/t = F^* - 4M/t$$

This can be shown by direct computation, or from general facts about conic problems and logarithmic barriers, since here we have 2 M second-order cones, each with a $\theta$-value of 2. For details, e.g. for a discussion of $\theta$-values, see Boyd and Vandenberghe, *Convex Optimization*, supra. It follows that the solution of the barrier subproblem is at most 4 M/t suboptimal for the FOP.

Newton Method

The barrier subproblem of Equation (20) can be solved by various techniques. One group of techniques is based on Newton's method. Several of the embodiments of the present invention use a particular form of Newton's method, a so-called "infeasible start Newton method" to solve the barrier subproblem.

The infeasible start Newton method begins with, and maintains, $(f, F, v) \in R^{3M} \times R \times R^6$, with $(f,F)$ strictly satisfying the cone constraints i.e., Equation (21), but not necessarily the equality constraints $A f + \omega^{ext} = 0$. Within a finite number of iterations, however, the equality constraints become satisfied, and once satisfied, they remain satisfied at all subsequent iterations. In particular, if the infeasible start Newton method is started at $(f, F, v)$ with the equality constraints $A f + \omega^{ext} = 0$ satisfied, the equality constraints will be satisfied at all future iterations.

At each iteration of the infeasible start Newton method, we compute the Newton step $(df, dF, dv)$ at the current point $(f, F, v)$. We then carry out a so-called "backtracking line search" to find a step length $\gamma$, based on the merit function $(\|r_d\|^2 + \|r_p\|^2)^{1/2}$, as follows. Let $\alpha \in (0, \frac{1}{2})$ be an algorithm parameter. Let $\beta \in (0,1)$ be another algorithm parameter. Let $r_d^\dagger$ and $r_p^\dagger$ be the primal and dual residuals evaluated at the tentative point $(f+\gamma df, F+\gamma dF, v+\gamma dv)$. The backtracking line search chooses $\gamma = \beta^k$ where $k$ is the smallest nonnegative integer for which $(f+\gamma df, F+\gamma dF)$ strictly satisfies the cone constraints and $$(\|r_d^{554}\|^2 + \|r_p^{554}\|^2)^{1/2} \leq (1 \alpha \gamma +)(\|r_d\|^2 + \|r_p\|^2)^{1/2}$$

The parameters must satisfy $0 < \beta < 1$ and $0 < \alpha < \frac{1}{2}$. Common choices for the parameters are $\beta = \frac{1}{2}$, $\alpha = 0.1$. The Newton method is fairly insensitive to the choice of these parameters.

After the line search, we update the new point as $$f := f + \gamma df, \ F := F + \gamma dF, \ v := v + \gamma dv.$$

The Newton method is terminated when the norm of the residual is small enough, or when some other exit criterion is satisfied. Once a full Newton step is taken, i.e., the line search gives $\gamma = 1$, the primal residual becomes zero, and remains zero (to within numerical accuracy) from that iteration on. See Boyd and Vandenberghe, *Convex Optimization*, supra., for further discussion.

The main effort of the algorithm is in computing the Newton step $(f, F, v) \in R^{3M+7}$, which is given by the solution of the Karush-Kuhn-Tucker (KKT) system $$\begin{bmatrix} \partial^2 \Phi / \partial f^2 & \partial^2 \Phi / \partial f \partial F & A^T \\ \partial^2 \Phi / \partial F \partial f & \partial^2 \Phi / \partial F^2 & 0 \\ A & 0 & 0 \end{bmatrix} \begin{bmatrix} df \\ dF \\ dv \end{bmatrix} = - \begin{bmatrix} r_f \\ r_F \\ r_p \end{bmatrix}$$

This is a set of $3M+7$ equations in $3M+7$ variables.

Since the log barrier is a sum of functions of each $f^{(i)}$, the second derivative appearing in the upper left entry of the KKT matrix is block diagonal. Hence, we can express the KKT system as $$\begin{bmatrix} H_1 & \cdots & & q_1 & A_1^T \\ & \ddots & & \vdots & \vdots \\ & & H_M & q_M & A_M^T \\ q_1^T & \cdots & q_M^T & H_F & 0 \\ A_1 & \cdots & A_M & 0 & 0 \end{bmatrix} \begin{bmatrix} df_1 \\ \vdots \\ df_M \\ dF \\ dv \end{bmatrix} = - \begin{bmatrix} r_1 \\ \vdots \\ r_M \\ r_F \\ r_p \end{bmatrix} \quad (22)$$

where $$H_i = \partial^2 \Phi_i / \partial f^{(i)} \partial f^{(i)} \in R^{3 \times 3} \quad (23)$$
$$H_F = \partial^2 \Phi / \partial F \partial F \in R$$
$$q_i = \partial^2 \Phi_i / \partial f^{(i)} \partial F \in R^3.$$

Explicit formulas for these are given below. For now, we note the sparsity pattern of the KKT system, which consists of a block diagonal part, with $M$ $3 \times 3$ blocks (each associated with a contact point), bordered by 7 dense rows and columns (corresponding to the objective variable $F$ and dual variable $v$). We refer to this sparsity pattern as the "SB structure".

The infeasible start Newton method always converges to the optimal point for the barrier subproblem, provided the original FOP is strictly feasible. When the original FOP problem is not strictly feasible, the barrier subproblem is not feasible, and the Newton method does not converge; the residuals do not converge to zero.

The convergence of Newton's method is quadratic, so terminal convergence is extremely fast. For the same reason, if the method is started at an initial point with primal and dual residuals not too large, convergence to high accuracy can be obtained within a few iterations. The total number of Newton iterations can be bounded using the theory of self-concordance, as described in the book Nesterov and Nemirovsky, *Interior-point polynomial methods in convex programming*, supra However, the bounds obtained are usually far larger than the actual number required in practice, which is often fewer than 10, and rarely more than a few 10 s. When the starting point is good, i.e., the starting residuals are small, convergence typically occurs in just a few iterations.

Barrier Gradient and Hessian Formulas

In this section we give explicit expressions for the gradient and Hessian of the log barrier, which are needed to define the dual residuals, and the coefficient matrix in the KKT system (23).

The log barrier $\phi$ is a sum of $2M$ terms, each of which is the negative log of a quadratic form. So we first give a general formula for the gradient and Hessian of the function $$\psi(u) = -\log(u^T P u)$$

where $P$ is a symmetric matrix. (We assume that $u^T P u > 0$). We have $$\nabla \psi = -2 P u / (u^T P u),$$

$$\nabla^2 \psi = -2 P / (u^T P u) + 4 (P u)(P u)^T / (u^T P u)^2 \quad (24)$$

Using this formula (or by direct differentiation) we have $$\partial \phi_i / \partial f_x^{(i)} = 2 f_x^{(i)} / (F^2 - f_x^{(i)2} - f_z^{(i)2}) + 2 f_x^{(i)} / (\mu_i^2 f_z^{(i)2} - f_x^{(i)2} - f_y^{(i)2})$$

If we define $$a_i = 2 / (F^2 - f_x^{(i)2} - f_y^{(i)2} - f_z^{(i)2})$$

$$b_i = 2 / (\mu_i^2 f_z^{(i)2} - f_x^{(i)2} - f_y^{(i)2})$$

this may be written as $$\partial \phi_i \partial f_x^{(i)} = (a_i+b_i) f_x^{(i)}$$

We have similar expressions for the partial derivative of $\partial \phi_i$ with respect to $f_y^{(i)}$. In these expressions $f_x^{(i)}$ is changed to $f_y^{(i)}$ in the numerators. The partial derivative with respect to $f_z^{(i)}$ is $$\partial \phi_i \partial f_z^{(i)} = (a_i - \mu_i^2 b_i) f_z^{(i)}$$

Thus, the gradient of $\phi_i(f^{(i)}, F)$ with respect to $f^{(i)}$ is given by $$\nabla_{f^{(i)}} \Phi_i(f^{(i)}, F) = \begin{bmatrix} (a_i+b_i)f_x^{(i)} \\ (a_i+b_i)f_y^{(i)} \\ (a_i-\mu_i^2 b_i)f_z^{(i)} \end{bmatrix}$$

The partial derivative of $\phi$ with respect to F is $$\partial \phi / \partial F = -F \Sigma_{i=1,\ldots,M}(a_i)$$

Therefore the dual residuals can be explicitly expressed as $$r_i = \begin{bmatrix} (a_i+b_i)f_x^{(i)} \\ (a_i+b_i)f_y^{(i)} \\ (a_i-\mu_i^2 b_i)f_z^{(i)} \end{bmatrix} + A_i^T v, \quad (25)$$

$$i = 1, \ldots, M$$

$$r_F = t - F\Sigma_{i=1,\ldots,M}(a_i)$$

Now we derive the blocks in the barrier Hessian $\nabla^2 \phi$, using the notation in on (23). Using the general Equation (24) above, we have $$H_i = a_i I + a_i^2 f^{(i)} f^{(i)T} + b_i \text{diag}(1,1,-u_i^2) + b_i^2 c_i c_i^T$$

where $c_i$ is the column vector $$c_i = (f_x^{(i)}, f_y^{(i)}, -\mu_i^2 f_z^{(i)})$$

This may be simplified and structured as the matrix $$H_i = \begin{bmatrix} H_i^{(x,x)} & H_i^{(x,y)} & H_i^{(x,z)} \\ H_i^{(y,x)} & H_i^{(y,y)} & H_i^{(y,z)} \\ H_i^{(z,x)} & H_i^{(z,y)} & H_i^{(z,z)} \end{bmatrix}$$

where the diagonal entries are $$H_i^{(x,x)} = a_i + b_i + (a_i^2+b_i^2)f_x^{(i)2}$$

$$H_i^{(y,y)} = a_i + b_i + (a_i^2+b_i^2)f_y^{(i)2}$$

$$H_i^{(z,z)} = a_i - \mu_i^2 b_i + (a_i^2 + \mu_i^4 b_i^2) f_z^{(i)2}$$

and the symmetric, off-diagonal entries are $$H_i^{(y,x)} = H_i^{(x,y)} = (a_i^2 + b_i^2)f_x^{(i)} f_y^{(i)}$$

$$H_i^{(z,x)} = H_i^{(x,z)} = (a_i^2 - \mu_i^2 b_i^2) f_x^{(i)} f_z^{(i)}$$

$$H_i^{(y,z)} = H_i^{(z,y)} = (a_i^2 - \mu_i^2 b_i^2) f_y^{(i)} f_z^{(i)}$$

The remaining element of the barrier Hessian is $$H_F = \partial^2 \phi / \partial F^2 = \Sigma_{i=1,\ldots,M}(F^2 + \|f^{(i)}\|^2)(a_i^2/2))$$

Finally, the vectors $q_i$ that form the last row and column of the Hessian are given by $$q_i = -a_i^2 F f^{(i)}$$

These formulas give an explicit form for the Karush-Kuhn-Tucker (KKT) system. They are used in several of the embodiments in computing the Newton step.

Custom Newton Step Computation, General Considerations

Next, we show how to compute the Newton step (df, dF, dv), i.e., solve Equation (22), efficiently. This matrix equation can be solved using standard methods for linear equations. A standard method would compute an $LDL^T$ factorization of the KKT matrix, and then find (df, dF, dv) by a back and forward substitution. The cost of this is around $(\frac{1}{3})(3 M+7)^3 + 2(3 M+7)^2 \approx 9 M^3 + 81 M^2 + 231 M + 212$ flops (floating point operations) where M is the number of contact points.

The left hand side of the KKT system has considerable structure. If it were entirely block diagonal, the different blocks could be solved separately. However, the presence of the rows and columns due to the $q_i$s and $A_i$s make such a method inapplicable.

Hence, we have devised a custom block elimination method, which referred to as the "CBE method". In outline, it is based on a sequence of two elimination steps, in which particular blocks of variables are eliminated, using Cholesky factorizations to compute the required inverses since their definiteness properties are known ahead of time. The leading 3 M×3 M block is block diagonal, with 3×3 blocks that are positive definite, and so can be inverted very efficiently. A basic elimination method applied to this block yields a 7×7 set of linear equations to solve. This reduced system of linear equations is indefinite, but it contains a 6×6 subblock that is positive definite, so a further elimination step can be taken, using a Cholesky factorization to invert the positive definite subblock.

As shown below, this custom method requires approximately 350 M+200 floating point operations, and in addition involves no conditionals that are needed to pivot in the general case. This leads to extremely fast execution time. For large values of M, our method is clearly far faster than a general method. It is also faster for small values of M. Consider, for example, grasping with a 5-fingered robotic hand. With M=5, the standard method takes approximately 4500 flops, whereas our method takes approximately 1950 flops, over twice as fast. Using cooperating manipulators and grasping with two 5-finger robotic hands uses 10 contact points. With M=10, the standard method takes approximately 19,600 flops, whereas our method takes approximately 3700, over 5 times as fast.

Before giving the details of our elimination method, we comment on how it differs from using a good sparse solver to compute the Newton step. Such a method decomposes the KKT matrix as $P L D L^T P^T$, where P is a permutation matrix chosen to reduce fill-in and preserve numerical stability, L is unit lower triangular, and D is diagonal. Depending on the solver, the permutation found may be good enough to yield an algorithm that solves the KKT system in O(M) flops. However, our method is completely explicit, and also exploits a small amount of further structure, such as the easy invertibility of the Cholesky factors. Moreover, our method involves no conditionals, which makes it faster (and simpler) than a generic sparse $P L D L^T P^T$ method. And finally, since our method uses an explicit elimination ordering, it expends no effort in discovering a good elimination ordering.

First Elimination St

Our first step is to eliminate the primal variables $df_i$ from Equation (22) by symbolic substitution. From $$H_i df_i + q_i dF + A_i^T dv = -r_i$$

we obtain $$df_i = -H_i^{-1}(r_i + q_i dF + A_i^T dv) \quad (26)$$

Combining this with $$\Sigma_{i=1,\ldots,M}(q_i^T df_i) + H_F dF = -r_F$$

we obtain $$-\Sigma_{i=1,\ldots,M}(q_i^T H_i^{-1}(r_i + q_i dF + A_i^T dv)) + H_F dF = -r_F$$

which can be written as $$\left(-H_F + \sum_{i=1,\ldots,M}(q_i^T H_i^{-1} q_i)\right)dF + \sum_{i=1,\ldots,M}(q_i^T H_i^{-1} A_i^T)dv = \quad (27)$$
$$r_F - \sum_{i=1,\ldots,M}(q_i^T H_i^{-1} r_i)$$

Now we use $$\Sigma_{i=1,\ldots,M}(A_i df_i) = -r_P$$

and (26) to get $$\Sigma_{i=1,\ldots,M}(A_i H_i^{-1}(r_i + q_i dF + A_i^T dv)) = r_P$$

which we write as $$\sum_{i=1,\ldots,M}(A_i H_i^{-1} q_i)dF + \sum_{i=1,\ldots,M}(A_i H_i^{-1} A_i^T)dv = \quad (28)$$
$$r_P - \sum_{i=1,\ldots,M}(A_i H_i^{-1} r_i)$$

Now we write Equations (27) and (28) in matrix vector form as $$\begin{bmatrix} E_{11} & E_{21}^T \\ E_{21} & E_{22} \end{bmatrix} \begin{bmatrix} dF \\ dv \end{bmatrix} = \begin{bmatrix} e_1 \\ e_2 \end{bmatrix} \quad (29)$$

where $$E_{11} = -H_F + \sum_{i=1,\ldots,M}(q_i^T H_i^{-1} q_i)$$

$$E_{21} = \sum_{i=1,\ldots,M}(A_i H_i^{-1} q_i)$$

$$E_{22} = \sum_{i=1,\ldots,M}(A_i H_i^{-1} A_i^T)$$

$$e_1 = r_F - \sum_{i=1,\ldots,M}(q_i^T H_i^{-1} r_i)$$

$$e_2 = r_P - \sum_{i=1,\ldots,M}(A_i H_i^{-1} r_i)$$

The matrix $H_i$ may be factored as $L_i L_i^T$, where $L_i$ is lower triangular. Hence $H_i^{-1}$ may be written as $L_i^{-T} L_i^{-1}$. Then the above equations may be written in a computationally efficient form involving common sub expressions that are used repeatedly:

$$E_{11} = -H_F + \Sigma_{i=1,\ldots,M}(L_i^{-1} q_i)^T(L_i^{-1} q_i)$$

$$E_{21} = \Sigma_{i=1,\ldots,M}(L_i^{-1} A_i^T)^T(L_i^{-1} q_i)$$

$$E_{22} = \Sigma_{i=1,\ldots,M}(L_i^{-1} A_i^T)^T(L_i^{-1} A_i^T)$$

$$e_1 = r_F - \Sigma_{i=1,\ldots,M}(L_i^{-1} q_i)^T(L_i^{-1} r_i)$$

$$e_2 = r_P - \Sigma_{i=1,\ldots,M}(L_i^{-1} A_i^T)^T(L_i^{-1} r_i)$$

The reduced system of Equations (29) is a set of 7 linear equations in 7 variables, which is easily solved to get dF and dv. Once these have been computed, we compute the primal variables $df_i$ from Equation (26).

Second Elimination Step

The reduced system of Equation (29) also has structure that can be exploited, even though it is fully dense. As we will show, the matrix E is not positive definite (or negative definite), so we cannot use a Cholesky factorization of E (or −E) to solve the system. We must use an $LDL^T$ factorization, or a factorization such as LDU that ignores the symmetry. Generic algorithms for each of these require numerical pivoting, which complicates (and slows) the algorithm.

The 1,1 entry $E_{11}$ is negative. This follows from convexity of $\phi$, which implies that the Hessian is positive definite; $-E_{11}$ is a Schur complement of $\nabla^2 \phi$, and therefore positive. Its 2,2 entry $E_{22}$ is, however, positive definite. It is clearly positive semidefinite; it is positive definite since the contact matrix A is full rank. Thus, the matrix E is indefinite; it has one negative eigenvalue and 6 positive eigenvalues. We can solve the reduced system of Equation (29) by eliminating the 1,1 block, which will leave a 6×6 system of equations that is positive definite, and can therefore be solved by a Cholesky factorization.

This approach does not reduce the flop count for the system of Equation (29), when compared to a generic $LDL^T$ factorization method. However, it removes all conditionals and row/column permutations (i.e., pivoting), and therefore yields a simpler and faster algorithm. Since the final system is solved by Cholesky factorization, the lack of pivoting comes at no cost in numerical stability.

To solve the reduced system of Equation (29) by this method we proceed as follows. We first note that $$dF = (e_1 - E_{21}^T dv)/E_{11}$$

and substituting this into $E_{21}$ dF+$E_{22}$ dv=$e_2$, we get $$(E_{22} - (E_{21} E_{21}^T)/E_{11})dv = e_2 - (E_{21} e_1)/E_{11}$$

Since $E_{11} < 0$, the matrix on the left is positive definite. Therefore we can solve this set of equations using Cholesky factorization. We then find dF from the equation above.

We refer to this procedure for solving the KKT system with SB structure as the "CBE method".

Number of Floating Point Operations

The number of floating point operations used by our method to compute the Newton step is as follows. As input, the Newton step is given the primal residuals, the dual residuals, and the Hessian, i.e., $H_i$, $H_F$, and $q_i$, computed using Equations (25) and (H1) through (H4).

First, we compute Cholesky factors $L_i$ of $H_i$, i.e. lower triangular $L_i$ such that $$L_i L_i^T = H_i.$$

This takes 14 flops, of which 3 are square root. We then compute the inverses of the Cholesky factors, i.e., $L_i^{-1}$. This takes 17 flops. The total is 31 flops.

Next, we compute the three common sub-expressions $L_i^{-1} A_i^T, L_i^{-1} q_i$, and $L_i^{-1} r_i$. $L_i^{-1}$ is lower triangular. The cost of multiplying a lower triangular 3×3 matrix by a 3×6 matrix is 54 flops. The cost of multiplying a lower triangular 3×3 matrix by each 3 vector is 9 flops. The total is 72 flops.

From these, we compute the data in the reduced system. In so doing, forming $E_{22}$ is the dominant cost. There are 21 entries in the upper triangle of the matrices in the sum (their lower halves are the same as their upper halves); each of these is computed as an inner product of two vectors in $R^3$, which costs 5 flops. This gives 5·21=105 flops for each term in the sum, plus 21 M flops to add the matrices. The total is 126 M flops to compute $E_{22}$. Forming $E_{11}$ and $e_1$ each costs 6 M flops; forming $E_{21}$ and $e_2$ each costs 31 M flops. Thus, the total flop count to form the reduced system is around 200 M flops.

The reduced system is solved using the method of the second elimination step above, which requires approximately 212 flops, independent of M. Finally, $df_i$ are computed from Equation (26), at a cost around 31 M flops.

In total, our method computes the Newton step in approximately 334 M+212 floating point operations, where M is the number of contact points. It is convenient to round this to 350 M+200.

Force Feasibility Problem

There is a computational problem closely related to the FOP. Rather than compute an optimal solution to the FOP, there are situations in which it is useful to determine whether a feasible solution exists. This gives rise to a so-called "force feasibility problem" or "FFP".

This problem does not depend on the measure used for the "size" of a force. We get the same problem whether we use $F^{max}$ or any of the alternative measures (e.g. $F^{sumsq}$) discussed in the alternative embodiments.

However, the FFP does depend on the friction model. For point contact with friction, a second-order cone formulation of the FFP is minimize s subject to $f^{(i)} + s\, e_3 \in K_i$, i=1, ... M, $-1 \leq s$ $Af + \omega^{ext} = 0$ where the optimization variables are $S \in R$ and $f \in R^{3M}$. Here, $e_3 = (0, 0, 1)$. The variable s, which is the objective in the FFP, can be interpreted as a fictitious force added to each of the normal forces $f_z^{(i)}$ for the purpose of satisfying the friction cone constraint. This fictitious force does not appear in the equilibrium condition $Af + \omega^{ext} = 0$. The goal of the minimization is to drive the fictitious force s to become zero (or negative). If we succeed, the corresponding contact force vector f is evidently feasible for the original FOP. On the other hand, if the optimal value of s is positive, it means that the FOP is infeasible.

The inequality $-1 \leq s$ is not essential. It can be omitted from the FFP with no loss of generality. It is included above because its presence tends to speed up the solution. It is used in the embodiments discussed below. However, alternative embodiments may omit it.

We can construct a primal barrier subproblem associated with the force feasibility problem. It is similar to the one for the FOP. The barrier subproblem is minimize $t\, s + \phi(f, s)$ subject to $Af + \omega^{ext} = 0$, (30)

where t>0 is the accuracy parameter, and $\phi(f, s)$ is the log barrier for the cone constraints of the FFP. Solving the primal barrier subproblem consists of finding a suitable scalar s and contact force vector f.

The log barrier is given by $$\Phi(f, s) = -\log(s+1) - \sum_{i=1, \ldots, M} \log(\mu_i^2 (f_z^{(i)} + s)^2 - f_x^{(i)2} - f_y^{(i)2})$$

when $f^{(i)} + s e_3 \in$ interior $K_i$, and $\phi(f, s) = \infty$ otherwise. The solution of this subproblem is at most $(2M+1)/t$ suboptimal for the FFP problem, since here we have M cones, each with $\theta$-value 2 and one linear inequality.

This barrier subproblem can be solved using a Newton method. The main effort of the algorithm is in computing the Newton step $(f, s, \nu) \in R^{3M+7}$, which is given by the solution of the Karush-Kuhn-Tucker (KKT) system. This has the same block structure as the KKT system of the FOP, with F replaced by s.

$$\begin{bmatrix} H_1 & \cdots & & q_1 & A_1^T \\ & \ddots & & \vdots & \vdots \\ & & H_M & q_M & A_M^T \\ q_1^T & \cdots & q_M^T & H_s & 0 \\ A_1 & \cdots & A_M & 0 & 0 \end{bmatrix} \begin{bmatrix} df_1 \\ \vdots \\ df_M \\ ds \\ d\nu \end{bmatrix} = - \begin{bmatrix} r_1 \\ \vdots \\ r_M \\ r_s \\ r_p \end{bmatrix}$$

where $H_i = \partial^2 \Phi / \partial f^{(i)} \partial f^{(i)}$ $H_s = \partial^2 \Phi / \partial s \partial s$ $q_i = \partial^2 \Phi / \partial f^{(i)} \partial s$ We define $z_i = s + f_z^{(i)}$ $d_i 2/(\mu_i^2 z_i^2 - f_x^{(i)2} - f_y^{(i)2})$ With this, the dual residuals can be explicitly expressed as $$r_i = \begin{bmatrix} d_i f_x^{(i)} \\ d_i f_y^{(i)} \\ -d_i \mu_i^2 z_i \end{bmatrix} + A_i^T \nu, \quad (31)$$

$i = 1, \ldots, M$ $r_s = t - 1/(1+s) - \sum_{i=1, \ldots, M} d_i \mu_i^2 z_i$ $r_p = Af + \omega^{ext}$ The elements of the matrix can be expressed as $$H_i = \begin{bmatrix} H_i^{(x,x)} & H_i^{(x,y)} & H_i^{(x,z)} \\ H_i^{(y,x)} & H_i^{(y,y)} & H_i^{(y,z)} \\ H_i^{(z,x)} & H_i^{(z,y)} & H_i^{(z,z)} \end{bmatrix}$$

We define $$g_i = 2/(\mu_i^2 z_i^2 - f_x^{(i)2} - f_y^{(i)2})^2$$

$$w_i = \mu_i^2(\mu_i^2 z_i^2 + f_x^{(i)2} + f_y^{(i)2})$$

With this, we can write the diagonal entries as $$H_i^{(x,x)} = g_i(\mu_i^2 z_i^2 + f_x^{(i)2} - f_y^{(i)2})$$

$$H_i^{(y,y)} = g_i(\mu_i^2 z_i^2 - f_x^{(i)2} + f_y^{(i)2})$$

$$H_i^{(z,z)} = g_i w_i$$

and the symmetric, off-diagonal entries as $$H_i^{(y,x)} = H_i^{(x,y)} = 2 g_i f_x^{(i)} f_y^{(i)}$$

$$H_i^{(z,x)} = H_i^{(x,z)} = -2 g_i f_x^{(i)} \mu_i^2 z_i$$

$$H_i^{(y,z)} = H_i^{(z,y)} = -2 g_i f_y^{(i)} \mu_i^2 z_i$$

The remaining element of the barrier Hessian is $$H_s = \partial^2 \phi / \partial s \partial s = 1/(1+s)^2 + \Sigma_{i=1,\ldots,M} g_i w_i$$

Finally, the vectors $q_i$ are given by $$q_i = \begin{bmatrix} -2 g_i f_x^{(i)} \mu_i^2 z_i \\ -2 g_i f_y^{(i)} \mu_i^2 z_i \\ g_i w_i \end{bmatrix}$$

This linear system has the same block and sparsity structure as the KKT system of the FOP. Therefore the CBE method can be used to efficiently compute the Newton step.

The dual force feasibility problem ("dual FFP") can be obtained from the earlier discussion of infeasibility conditions. The dual FFP is maximize $v^T \omega^{ext}$ subject to $A_i^T v \in K_i^*$, $i=1, \ldots M$ The dual FFP may be used in various embodiments as a termination condition when solving the force feasibility problem.

First Embodiment: Termination on Absolute Tolerance

The first embodiment is a customization of the standard primal barrier method, designed for solving the force optimization problem and related problems.

In a standard primal barrier method, the barrier subproblem of Equation (20) is solved for an increasing sequence of values of the accuracy parameter t. The Newton method for each subproblem is initialized at the optimal solution of the previous one. A typical method for increasing the accuracy parameter t is to multiply it by a factor on the order of 10. (See Boyd and Vandenberghe, *Convex Optimization*, supra.) This is repeated until $\Gamma/t$ is smaller than the required tolerance, where $\Gamma$ is a problem parameter computed from the number and order of the inequalities. For 2M inequalities of order 2, $\Gamma$ is 4M, so the test compares 4M/t with the required tolerance. This basic barrier method can solve the FOP using on the order of 50 or so Newton iterations, provided the problem is feasible and provided it is supplied with a starting point that is reasonably close to feasible.

The first embodiment differs from the standard method in that it solves the primal barrier subproblem for a fixed value of the accuracy parameter t. Choosing a fixed value of t is a poor choice for solving general SOCPs, especially when high accuracy is required, and the number of constraints is large. Hence a fixed value t is rarely if ever used. For a further discussion of this issue, see Boyd Vandenberghe, *Convex Optimization*, supra., Section 11.3.

However, for the particular purpose of solving the force optimization problem, a fixed value of t can be made to work well and the first embodiment achieves this. There are several reasons. First, the number of constraints is modest. This is a consequence of the modest number of contact points and also the choices made above for the second-order cone formulation. Second, high accuracy is not required in the solution to the force optimization problem. The coefficient of friction is rarely known and repeatable to better than 1% accuracy. Feasible solutions that differ by 1% are typically equivalent for all practical purposes. Hence, in the first embodiment, the external wrench is scaled by a suitable choice of units so that the maximum value of its components are on the order of 1 to 10 units and the required tolerance of the method is set to be generally on the order of 0.1 units. The method of the first embodiment is not particularly sensitive to these particular values and other choices may be made with similar results. Other embodiments of the present invention deal with accuracy in other ways as described below.

The custom primal barrier method of the first embodiment can solve the force optimization problem satisfactorily using between 5 and 10 iterations, which is almost an order of magnitude fewer Newton iterations than the standard method.

The first embodiment has two major advantages compared with standard software for solving SOCPs. First, it solves the force optimization problem using significantly fewer Newton iterations than a standard method. Second, each Newton iteration requires significantly fewer floating point operations than a standard method, because it uses the CBE method. These are two advantages of the present invention.

The first embodiment consists of two major phases: (1) Computing a feasible (but sub-optimal) contact force vector. (2) Computing an optimal contact force vector using the result of phase 1 as a starting point.

Computing an Feasible Contact Force Vector

In general, a feasible contact force vector is computed by solving the barrier subproblem of Equation (30), for a fixed value of the accuracy parameter t, using Newton's method.

The inputs to the method are the contact matrix A, the external wrench $\omega^{ext}$, and the coefficients of friction $\mu_i$. Additionally, there are several parameters:

required solution tolerance $\epsilon_{abs} > 0$,
convergence tolerance $\epsilon_{tol} > 0$,
parameter $s_{margin} > 0$.

The method used is outlined in FIG. 1, which shows the steps of the main loop. In Step 101, the Newton step is computed. In Step 102, a line search is used to compute the step size $\gamma$. In Step 103, the triple (f, s, v) is updated. In Step 104, the DualFeasibilityTest is evaluated and used to decide whether to terminate with an indication of infeasibility. In Step 105, the scalar s is tested against a parameter $s_{margin}$ to determine whether to terminate with a feasible triple. In Step 106, the residual r is computed. In Step 107, the residual is used to decide whether the process is to be repeated. In Step 108, the scalar s is tested against the absolute tolerance $\epsilon_{tol}$ and used to decide whether to return with an indication of infeasibility. In Step 109, the scalar s is tested and used to decide whether to return with a feasible triple or an indication that feasibility is uncertain.

This may also be described as follows:

---

Given                                                                                                       (32)
  required solution tolerance $\epsilon_{abs} > 0$
  convergence tolerance $\epsilon_{tol} > 0$
  parameter $s_{margin} > 0$
Set $t := (2M+1)/\epsilon_{abs}$
Initialize $f = -A^T(AA^T)^{-1} \omega^{ext}$
Initialize $s := \text{ComputeS}(f, \mu)$
Initialize $v := 0$
Repeat
  1. Compute Newton step (df, ds, dv) for the KKT system of the FFP.
  2. Line search: Choose a step size $\gamma$ using a backtracking line search
  3. Update: $(f, s, v) := (f, s, v) + \gamma * (df, ds, dv)$.
  4. if DualFeasiblyTest(v) return "Infeasible"
  5. if $s \leq -s_{margin}$ return the feasible triple (f, s, v)
  6. Let r be the residual, computed as described below.
  7. if $r < \epsilon_{tol}$ then
  {   8. if $\epsilon_{abs} < s$ return "Infeasible";
      9. if $s < 0$ return the feasible triple (f, s, v);
          else return "FeasibilityUncertain"
}

---

In regard to the initializations, note that (1) The initialization of the contact force vector f insures that it satisfies the equilibrium equation. Of course, it need not satisfy the cone constraints; for example, the normal forces $f_z^{(i)}$ can be negative.

(2) The initialization procedure ComputeS(f, μ) returns a value s that satisfies $$s \geq \max_{i=1,\ldots,M}(1/\mu_i)(f_x^{(i)2}+f_y^{(i)2})^{1/2}-f_z^{(i)}$$

(3) The initialization of f and s insures that the pair (f, s) is feasible for this FFP.

In regard to the repeated loop, the following points should be noted:

The accuracy parameter t appears in KKT system and in the dual residual, which appears in the backtracking line search.

The Newton step for the KKT system of the FFP is computed using the CBE method.

The backtracking line search is carried out as described above. The first embodiment chooses the parameter α as 0.01 and the parameter β as 0.5. The method is not particularly sensitive to these particular values and other choices may be made with similar results.

The DualInfeasibilityTest(v) is defined as $$0 < v^T \omega^{ext} \text{ AND } (A_i^T v \in K_i^*, i=1,\ldots M)$$

When this is true, the dual variable v is feasible and the dual objective value $v^T \omega^{ext}$ is strictly positive. Hence, the primal problem is infeasible; see Equation (18). Any further refinement is irrelevant, so the procedure terminates. Using the dual objective in the convergence test allows the procedure to terminate before Newton's method converges and thereby achieves a computational speedup. This is one of the advantages of the present invention.

The variable s, which is the objective in the FFP, can be interpreted as a fictitious force added to each of the normal forces for the purpose of satisfying the friction cone constraint. If s is ever less than zero, a strictly feasible solution has been computed. However, if s is negative and very close to zero, then the associated solution is inside, but very close to a cone boundary. The solution provides a poor starting point for the next phase. Hence, it is desirable to find a solution where s is at least some distance below zero. The parameter $s_{margin}$ specifies the distance. There is a computational trade off: A larger value of $s_{margin}$ requires more work in this phase, but less in the following; a smaller value of $s_{margin}$ has the reverse effect. The first and second embodiments use the value $s_{margin} = 0.2$.

The residual is computed as $r = (\|r_d\|^2 + \|r_p\|^2)^{1/2}$, where, $r_p$ and $r_d$ are the primal and dual residuals defined in Equation (31).

Once the residual is sufficiently small, the procedure terminates. If s is larger than the solution tolerance $\epsilon_{abs}$, the system is clearly infeasible, for the optimal value cannot differ from s by more than $\epsilon_{abs}$. If s is smaller than zero, the system is clearly feasible.

If neither is the case, then the situation is uncertain and the procedure signals this case. Computation with a tighter convergence criterion could make the region of ambiguity smaller, but some region of ambiguity will remain with any finite tolerance. With a reasonable choice of solution tolerance $\epsilon_{abs}$, the issue is practically unimportant. If the value of s is non-negative but very small, the FFP is very close to infeasible. Even if it were feasible, a small change in the position of the contact points or the coefficients of friction could readily make it infeasible. For all practical purposes, it can be treated as if it were infeasible.

Computing an Optimal Contact Force Vector

In outline, an optimal contact force vector is computed by solving the barrier subproblem of Equation (20), for a fixed value of the accuracy parameter t, using Newton's method. Once f is feasible, the method evaluates the current maximum force $F^{max} = \max\{\|f^{(1)}\|, \ldots, f^{(M)}\|\}$ using the current value of f, and the current dual bound $F_{dual}$ from Equation(16) using the current value of the dual variable $\epsilon$. The method terminates if the current maximum force $F^{max}$ is within a given tolerance of the current dual lower bound $F_{dual}$.

The inputs to the method are the contact matrix A, the external wrench $\omega^{ext}$, and the coefficients of friction $\mu_i$. Additionally, there are several parameters:

starting point (f, F, v) that satisfies Equation (21)
required solution tolerance $\epsilon_{abs} > 0$,
parameter $\eta \in (0,1)$.

Figure 2:
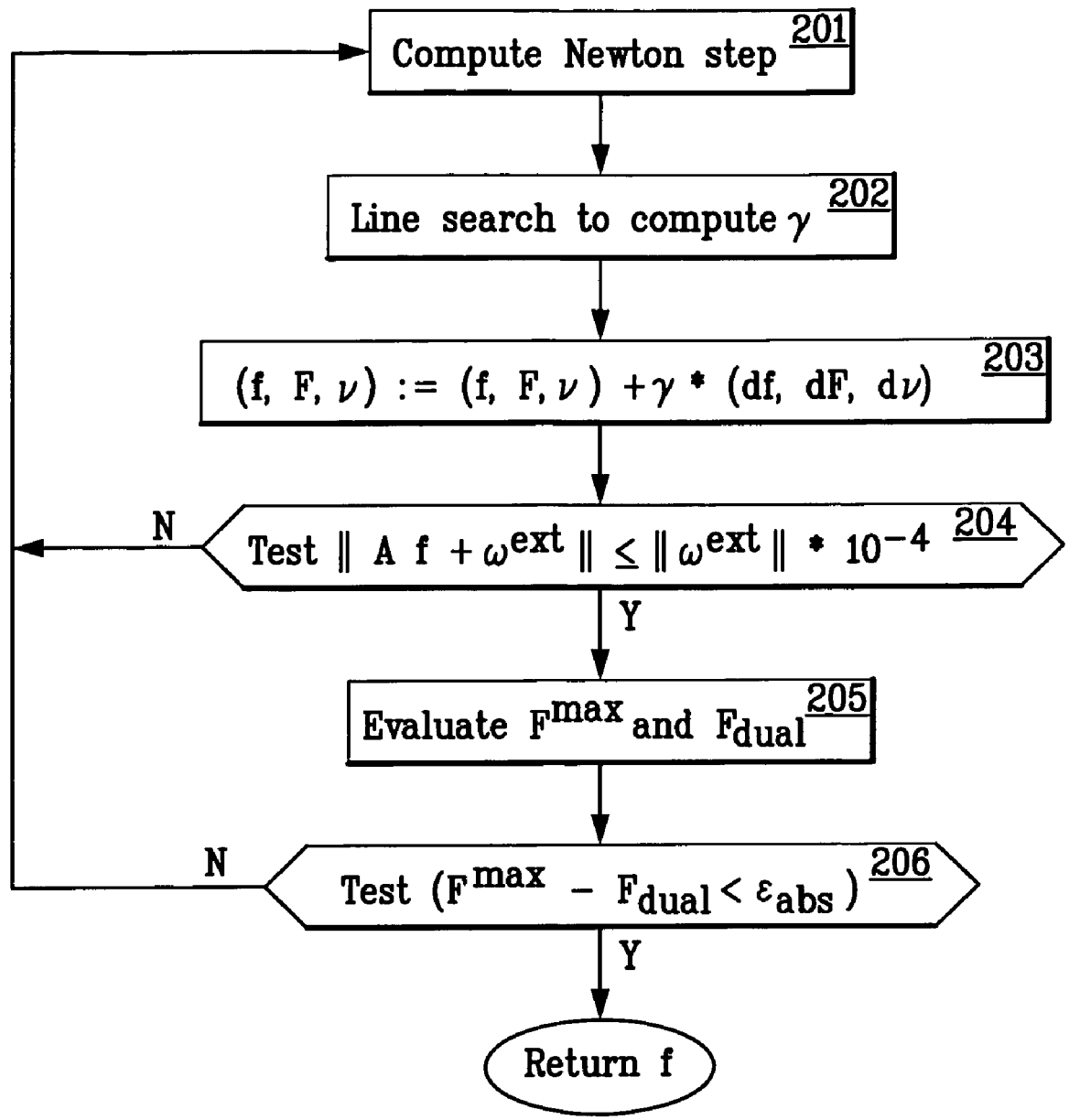
FIG. 2 is a schematic drawing showing the main steps of computing an optimal contact force vector according to an embodiment of the invention.

The method used is outlined in FIG. 2, which shows the steps of the main loop. In Step 201, the Newton step is computed. In Step 202, a line search is used to compute the step size γ. In Step 203, the triple (f, F, v) is updated. In Step 204, the norm of the primal residual is tested to see if the procedure should be repeated. In Step 205, $F^{max}$ and $F_{dual}$ are evaluated. In Step 206, the difference $F^{max} - F_{dual}$ is compared with an absolute tolerance $\epsilon_{abs}$ to determine if an optimal contact force vector has been found.

This may also be described as follows:

---

Given                                                                                (33)
  starting point (f, F, v) that satisfies Equation (21)
  required absolute tolerance $\epsilon_{abs} > 0$
  parameter $\eta \in (0,1)$
Set $t := 4M/(\eta \epsilon_{abs})$
Repeat
  1. Compute Newton step (df, dF, dv) for the KKT system of the FOP.
  2. Line search: Choose a step size γ using a backtracking line search.

-continued

3. Update. (f, F, ν) := (f, F, ν) + γ * (df, dF, dν).
4. if $\|A f + \omega^{ext}\| \leq \|\omega^{ext}\| * 10^{-4}$ then
{    5. evaluate $F^{max}$ and $F_{dual}$
     6. if ($F^{max} - F_{dual} < \epsilon_{abs}$) then return optimal contact force vector f
}

A few observations about the operation of this procedure may be made:

(1) Let ($f_0$, $s_0$, $\nu_0$) be the feasible triple computed by Phase 1. The starting point (f, F, $\epsilon$) can be taken to be ($f_0$, $s_0$, $\nu_0$). In some cases, there is a small computational advantage to use the starting point ($f_0$, $s_0$, 0) and the first embodiment does this.

(2) The accuracy parameter t appears in KKT system and in the dual residual, which appears in the backtracking line search.

(3) The Newton step for the KKT system of the FOP is computed using the CBE method.

(4) The backtracking line search is carried out as described above. The first embodiment chooses the parameter α as 0.01 and the parameter β as 0.5. The method is not particularly sensitive to these particular values and other choices may be made with similar results.

(5) The test $\|A f+\omega^{ext}\| \leq \|\omega^{ext}\|*10^{-4}$ insures that the equilibrium equation is satisfied to a satisfactory relative tolerance.

(6) $F_{dual}$ is evaluated using Equation (16)

Several properties of this procedure should be noted.

(1) The procedure exits with a guarantee (via the dual bound) that the maximum force is no more than $\epsilon_{abs}$-suboptimal. That is, if F* is the optimal value, then $$F^{max} - F^* \leq \epsilon_{abs}$$

The absolute stopping criterion, $F^{max} - F_{dual} < \epsilon_{abs}$, uses the objective of the dual problem in the convergence test. This test can be satisfied before Newton's method converges and thereby achieves a computational speedup. This is one of the advantages of the present invention.

(2) The exit condition must hold eventually. Suppose it does not. Newton's method eventually converges to the optimal point for the barrier subproblem; at that point, the following relationship would hold $$F^{max} - F_{dual} \leq F^* - F_{dual} = 4M/t = ((\eta \epsilon_{abs}) < \epsilon_{abs}$$

which is a contradiction.

(3) The parameter η gives a 'margin' that guarantees that if Newton's method were to converge, the gap between $F^{max}$ and the lower bound $F_{dual}$ is smaller than the tolerance. The first preferred embodiment uses a value of η=0.8. However, the procedure is not sensitive to the particular choice of η and a wide variety of values may be used with essentially equivalent results.

Second Embodiment: Termination on Relative Tolerance

The first embodiment produces a solution whose objective value is guaranteed to be within an absolute tolerance $\epsilon_{abs}$ of the optimal value. The second embodiment solves the primal barrier subproblem to a relative tolerance. This is a novel technique that is suitable in certain applications. The solution has the property that the computed value is within the fraction $\epsilon_{rel}$ of the optimal value. For reasonable values of the parameter $\epsilon_{rel}$, the second embodiment can solve the force optimization problem satisfactorily using between 5 and 10 Newton iterations.

The second embodiment has two major advantages compared with standard software for solving SOCPs. First, it solves the force optimization problem using significantly fewer Newton iterations than a standard method. Second, each Newton iteration requires significantly fewer floating point operations than a standard method, because it uses the CBE method. These are two advantages of the present invention.

The second embodiment uses the same means to compute a feasible contact force vector as the first embodiment. That is, its first phase is the same.

In its second phase, the second embodiment computes an optimal contact force vector to a relative tolerance. The inputs are the contact matrix A, the external wrench $\omega^{ext}$, and the coefficients of friction $\mu_i$. Additionally, there are several parameters:

required relative tolerance $\epsilon_{rel} > 0$,
estimate for the absolute tolerence $\epsilon_{abs} > 0$
parameter $\eta \in (0,1)$
starting point (f, F, ν) that satisfies Equation (21)

Figure 3:
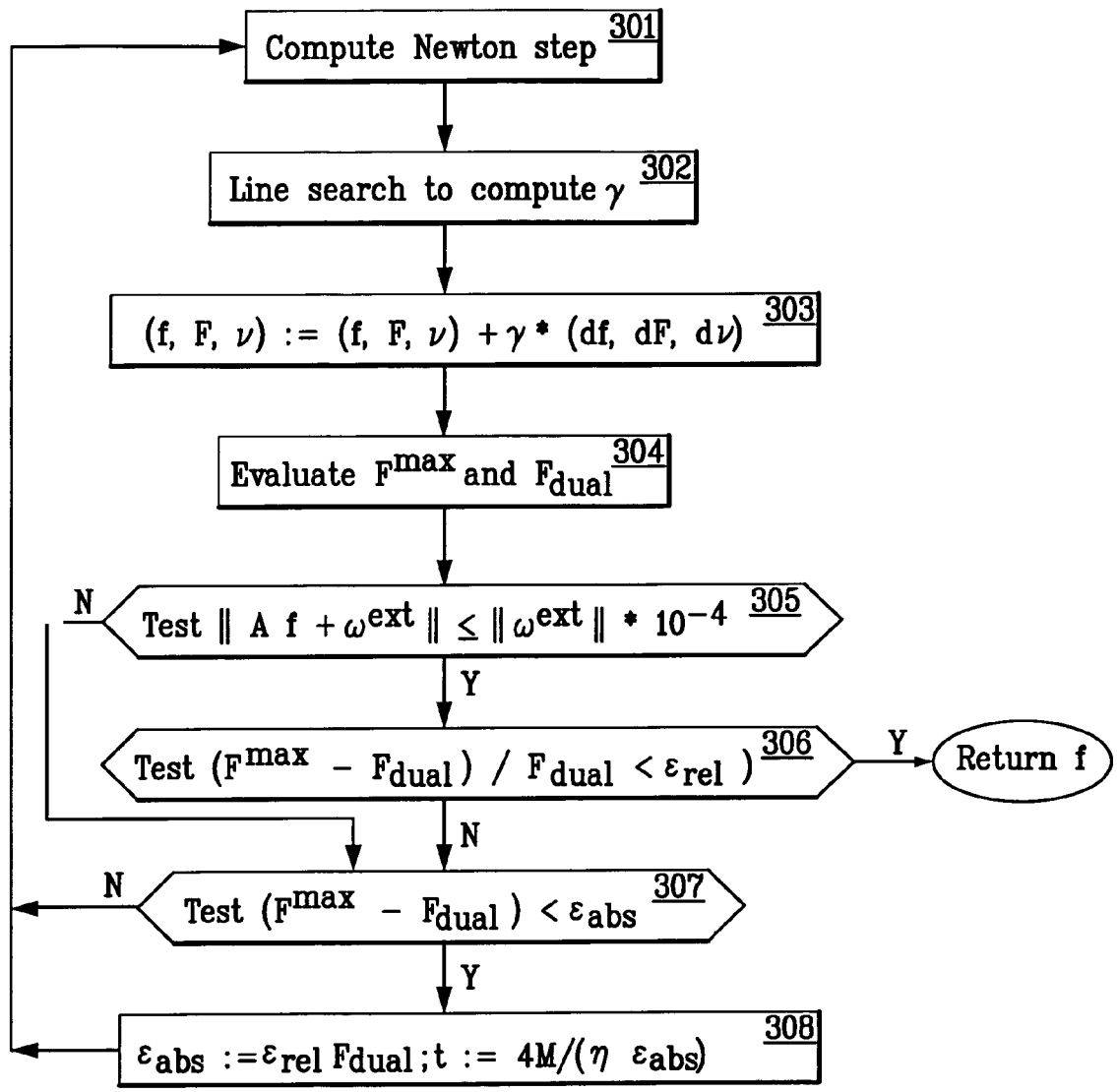
FIG. 3 is a schematic drawing showing the main steps of computing an optimal contact force vector according to another embodiment of the invention.

The method used is outlined in FIG. 3, which shows the steps of the main loop. In Step 301, the Newton step is computed. In Step 302, a line search is used to compute the step size γ. In Step 303, the triple (f, F, $\epsilon$) is updated. In Step 304, $F^{max}$ and $F_{dual}$ are evaluated. In Step 305, the norm of the primal residual is tested. In Step 306, the ratio ($F^{max} - F_{dual}$)/$F_{dual}$ is compared with a relative tolerance $\epsilon_{rel}$ to determine if an optimal contact force vector has been found. In Step 307, the difference $F^{max} - F_{dual}$ is compared with an absolute tolerance $\epsilon_{abs}$. If it is smaller, then in Step 308, the absolute tolerance $\epsilon_{abs}$ and the accuracy parameter t are updateded.

This may also be described as follows:

Given (34)

required relative tolerance $\epsilon_{rel} > 0$ estimate for the absolute tolerance $\epsilon_{abs} > 0$ parameter $\eta \in (0,1)$ starting point (f, F, ν) that satisfies Equation (21)

Set $t := 4M/(\eta \epsilon_{abs})$

Repeat

1. Compute Newton step (df, dF, dε) for the KKT system of the FOP.

2. Line search: Choose a step size γ using a backtracking line search.

3. Update. $(f,F,\nu) := (f,F,\nu) + \gamma*(df,dF,d\nu)$.

4. evaluate $F^{max}$ and $F_{dual}$ 5. if $\|Af+\omega^{ext}\| \leq \|\omega^{ext}\|*10^{-4}$ then 6. if $(F^{max} - F_{dual})/F_{dual} < \epsilon_{rel}$ then return optimal contact force vector f 7. if $(F^{max} - F_{dual} < \epsilon_{abs})$ then 8. $\{\epsilon_{abs} := \epsilon_{rel} F_{dual}; t := 4M/(\eta \epsilon_{abs})\}$ Observe that the assignment $\epsilon_{abs}:=\epsilon_{rel}F_{dual}$ reduces the absolute tolerence $\epsilon_{abs}$ and the accuracy parametry t is correspondingly increased. Eventually, the relative stopping criterion $(F^{max}-F_{dual})/F_{dual}<\epsilon_{rel}$ is satisfied. The relative stopping criterion uses the objective of the dual problem in the convergence test. This test can be satisfied before Newton's method converges and thereby achieves a computational speedup. This is one of the advantages of the present invention.

Third Embodiment: Warm Start

Suppose that in some application, a force optimization problem has been solved and then it is necessary to solve a new FOP with problem data that is "close" to the solved problem, i.e., the external wrench $\omega^{ext}$, the contact matrix A, and the coefficients of friction $\mu_i$ are not far from those of a previously solved problem. In the general case, a set of related force optimization problems are to be solved.

This third embodiment is a method for finding the solution to a set of force optimization problems. It solves the first problem of the set using the method of the first or second embodiment and retains the solution state. It then uses a warm-start method to solve the remaining problems.

The so-called "warm-start" method uses the contact force vector $f_{prior}$ from the retained solution state as the starting point for Newton's method in the barrier subproblem. This assumes that $f_{prior}$ satisfies the friction cone constraints for the new problem. If it does not, a closely related f is constructed that satisfies the new friction cone constraints by adding some extra inward normal force to each contact force that does not satisfy its cone constraint.

The prior contact force vector $f_{prior}$ will not, in general, satisfy the equilibrium conditions for the new problem. However, if the new problem is strictly feasible, a feasible point will eventually be found by an infeasible start Newton method. The method used to compute an optimal contact force may be that of the first embodiment, the second embodiment, or any suitable alternative embodiment that uses an infeasible start Newton method.

If the new FOP problem data are close enough to the prior FOP problem data, the new problem can typically be solved in just a few Newton iterations. In particular, the correction term created by the presence of the primal residual in the right hand side of the infeasible start Newton method will cause the final contact force vector to satisfy the equilibrium conditions.

On the other hand, it is possible that this approach can require more iterations than a "cold-start" method, i.e., solving the new problem as a new one. As an extreme example, if the new problem is infeasible, then Newton's method will fail to converge. This issue is handled by running the warm-start method for a maximum number of iterations. If a feasible point has not been found by then, the warm-start method is abandoned and the new problem is solved using a cold-start method.

In the third embodiment, the maximum of warm-start iterations is fixed at 6. However, the procedure is not particularly sensitive to this choice and a variety of values may be used with similar results.

The warm-start method is advantageous if iterations saved in the successful warm-start attempts more than offset the extra iterations wasted in warm-start failures. In many applications, this is frequently the case. Two particular cases may be noted. In the first, the various problems have different contact points and the same external wrench; if the contact points are similar from problem to problem, the warm-start method may be useful. In the second, the various problems have the same contact points and different external wrenches; if the external wrenches are similar from problem to problems, the warm-start method may be useful.

Fourth Embodiment: Minimum Force Over a Set

In some applications, it is necessary to determine the minimum force required to satisfy any of a set of force optimization problems. That is; to determine the "best-case" or minimum value of the contact force required to satisfy any of the set. This is referred to as the "minimum force optimization problem" or "MinFOP".

One particular example is the problem of optimizing the position and orientation of a robotic hand, relative to an object, using the minimum force required to grasp the object as the objective to be minimized. This is the (nonconvex) problem of optimizing the contact points at which to grasp a given object. This can be done using an outer search loop that generates candidate manipulator positions and orientations; for each candidate, contact points are chosen, and the associated FOP is solved to determine the minimum force required to grasp the object. Here the goal is to find the best set of contact points, i.e., the contact points that (among those considered) minimize the grasping force. In this case, the contact points change, but external wrench remains the same throughout the optimization.

The MinFOP problem consists of a sequence of related FOPs. The problems could, of course, be solved independently, using the first, second, or some suitable alternative embodiment. If the problem data are close, the fourth embodiment as described here provides a more efficient technique for determining the minimum force required to satisfy any of a set of force optimization problems.

The fourth embodiment is based on the warm-start method described above, with the addition of so-called "dual short-circuiting". It operates as follows.

(1) A current best-case minimum value, $F_{globalMin}$, of minimum contact force is maintained. $F_{globalMin}$ is initially set to $\infty$.

(2) Each FOP is solved using a warm-start method, resulting in a contact force vector f. Let F be the objective value for such a solution, i.e. $F=\max_{i=1,\ldots,M}\|f^{(i)}\|$. After each solution is computed, $F_{globalMin}$ is set to $\min(F_{globalMin},F)$.

(3) During each Newton iteration, the procedure computes the dual objective value. It terminates solution of that FOP early if the dual objective value exceeds the best-case minimum value $F_{globalMin}$. This is referred to as the "dual short-circuiting" test.

This is called "dual short-circuiting" since it terminates a force optimization problem when the lower bound provided by the dual objective value exceeds a target value (i.e., the current best-case value). Once it is determined that some dual lower bound exceeds a target value, there is no point in continuing, for the solution can only be larger. Note that with warm-start and dual short-circuiting, it is possible to expend zero Newton iterations on a FOP. This occurs if the dual variable v, from the last problem solved, certifies that the minimum contact force for the new problem will be worse than $F_{globalMin}$.

Fifth Embodiment: Maximum Force Over a Set

In some applications, it is necessary to determine the maximum force required to satisfy any of a set of force optimization problems. That is, to determine the "worst-case" value of the contact force required to satisfy any of the set. This is referred to as the "maximum force optimization problem" or "MaxFOP".

One particular example is the problem of finding the maximum contact force that is required to move an object along a given trajectory. Of particular interest is the case where the object is rotated. Assume that the contact points remain the same, i.e., the object is not allowed to slip. By choosing a coordinate system tied to the object, the contact matrix A remains the same along the trajectory, but the external wrench $\omega^{ext}$ changes. The computation must find the maximum contact force over the set of external wrenches.

The MaxFOP problem consists of a sequence of related FOPs. They could, of course, be solved independently, using the first, second, or some suitable alternative embodiment. If the problem data are close, the fifth embodiment as described here provides a more efficient technique for determining the maximum force required to satisfy any of a set of force optimization problems.

The fifth embodiment is based on the warm-start method described above, with the addition of so-called "primal short-circuiting". It operates as follows:

(1) A current worst-case maximum value, $F_{globalMax}$, of minimum contact force is maintained. $F_{globalMax}$ is initially set to 0.

(2) Each FOP is solved using a warm-start method, resulting in a contact force vector f. Let F be the objective value for such a solution, i.e. $F=\max_{i=1,\ldots,M}\|f^{(i)}\|$. After each solution is computed, $F_{globalMax}$ is set to $\max(F_{globalMax}, F)$.

(3) During the solution of each FOP, the procedure terminates early if it finds a feasible contact force vector f, with $F^{max}$ smaller than the worst-case maximum value $F_{globalMax}$.

This is called "primal short-circuiting" since it terminates a force optimization problem when the primal value is less than a target value (i.e., the current worst-case value). Once it is determined that some $F^{max}$ is less that a target value, there is no point in continuing, for the solution can only be smaller.

Sixth Embodiment: Testing Force Closure

In some applications, it is necessary to determine whether a set of contact points is capable of resisting an arbitrary external wrench. The issue is whether, for each external wrench, some contact force vector can be found. This is referred to as "solving the force closure problem".

Recall that force closure can be determined by solving a set of FOPs. Let $\omega_1, \ldots, \omega_K \in R$ be a set a of wrenches with 0 in the interior of their convex hull, i.e., there exist positive $\lambda_1, \ldots, \lambda_K$ such that $$\lambda_1\omega_1 + \ldots + \lambda_K\omega_K = 0$$

The minimum possible value of K is 7. Force closure occurs if and only if each of these wrenches can be resisted, i.e., the associated K FOPs are all feasible.

The sixth embodiment constructs a set of wrenches with the required property. It employs a minimal set, i.e., 7 wrenches. In particular, it constructs the wrenches as the vertices of a regular simplex in $R^6$, centered at 0, so the sum of the wrenches is zero. Moreover, the wrenches all have unit norm, and are maximally equidistant on the unit sphere.

The method proceeds as follows:

(1) The method first constructs the 7×7 matrix Z, $$Z = I - (1/7)nn^T$$

where $n \in R^7$ is the vector with all entries one. This matrix has value $6/7$ on its diagonal, and $-1/7$ for each off-diagonal entry. Its eigenvalues are 0 (with multiplicity one) and 1 (with multiplicity 6).

(2) The method factors Z as $Z=V^T V$, where $V \in R^{6\times 7}$, using the eigenvalue decomposition. Let $v_1, \ldots, v_7$ denote the 7 columns of V. Since $Z=V^T V$, it follows that $\|v_i\|=(6/7)^{1/2}$, and that $v_i^T v_j = -1/7$ for $i \neq j$. Hence, the angle between $v_i$ and $v_j = \cos^{-1}(-1/6) \approx 100$ deg for $i \neq j$.

(3) The method chooses $\omega_i = (7/6)^{1/2} v_i$, $i=1, \ldots 7$.

(5) The method computes the contact matrix A from the set of contact points.

(6) The method tests the FOP associated with each of the $\omega_i$ for feasibility. If they are all feasible, then the set of contact points achieves force closure.

Seventh Embodiment: Very Rapid Computation of a Conservative Contact Force VECTOR In some applications, it is necessary to compute a feasible but possibly suboptimal contact force vector very rapidly for each of a sequence of external wrenches. Specifically, suppose that the set of contact points is fixed and a sequence of external wrenches is to be considered. A contact force vector is to be found as quickly as possible to resist each wrench. It need not be optimal, but it must obey the friction cone constraints and achieve equilibrium, i.e., the contact force vector so constructed must be "conservative". If the set of contact points does not achieve force closure, this must be detected at the outset.

One particular example occurs when an object is to be grasped and held while the external wrench is changed very rapidly. An exact solution is less important than one that can be computed very rapidly—to keep pace with the change in external wrench.

The seventh embodiment is a technique for such situations. It constructs a set of 12 "basis wrenches" and uses them to find 12 "basis contact force vectors". Given a new external wrench, a conservative contact force vector can be readily constructed from theses.

The specific result of these computations depends on the coordinate system. In particular, the equilibrium equation A f+$\omega$=0 can be computed in any coordinate system. The contact force vector f is coordinate-invariant, whereas A and X are coordinate-dependent and must be expressed in the same coordinate system. A desirable choice of coordinate system is one in which the "base contact force vectors" are small. The seventh embodiment chooses such a coordinate system.

The method has two steps. (1) A preprocessing step that constructs the basis wrenches and basis contact force vectors for a set of contact points. (2) Constructing a conservative contact force vector for a new external wrench.

The first phase operates as follows:

(1) It chooses the 12 wrenches $$\pm e_1, \ldots, \pm e_6$$

where $e_i$ is the ith unit vector in $R^6$. The sum of these wrenches is zero, so the condition of Equation (10) holds.

(2) It computes the center of the contact points. From these, it constructs a new coordinate system C with its origin at their center. It computes the contact matrix A in the coordinate system C.

(3) It solves the 12 associated FOPs. If any of them is infeasible then there is a wrench that cannot be resisted, so the method returns an indication that the set of contact forces does not achieve force closure.

(4) If all of the FOPs are feasible, then the resulting contact force vectors are stored as base contact force vectors. The set of base contact-force vectors has 12 elements. Let $f_i^+$ be the resulting contact force vector for wrench $+e_i$, and let $f_i^-$ be the resulting contact force vector for wrench $-e_i$. The coordinate system C is also stored.

The second phase operates as follows:

(1) Given a new external wrench $\omega^{ext}$, it is transformed into the coordinate system C. Let $\omega$ be the wrench expressed in the coordinate system C.

(2) Choose the conservative contact force vector to be the linear combination $$f = \Sigma_{i=1,\ldots,6} (\omega_i)_+ f_i^+ + (\omega_i)_- f_i^- \qquad (35)$$

where $\omega_i$ denotes the ith component of $\omega$, where $(u)_+ = \max\{0, u\}$ is the positive component of $u \in R$, and where $(u)_- = \max\{0, -u\}$ is the negative component of $u \in R$. Since f is invariant to choice of coordinate system, it is a feasible contact vector for the original external wrench $\omega^{ext}$.

Several properties of this method may be observed.

First, it may be carried out very rapidly. Second, it tends to yield general contact force vectors that are not too far from optimal.

Third, the first phase may be used to obtain a qualitative measure of force closure. Each of the 12 FOPs has a contact force vector and an associated optimal scalar value. Let $F_1, \ldots F_{12}$ be the 12 optimal (scalar) values of the 12 FOPs. Let $F_m$ be their maximum. Let $\omega^{ext}$ be an external wrench and let $\|\omega^{ext}\|_1 = |\omega_1^{ext}| + \ldots |\omega_6^{ext}|$. Then the minimum force required to resist the wrench $\omega^{ext}$ is no more than $F_m \|\omega^{ext}\|_1$. Thus, the scalar $F_m$ gives a quantitative measure of force closure.

Fourth, there are other computational uses of Equation (35). Suppose an optimal contact force vector f has been computed for a wrench $\omega$. Suppose it is next necessary to compute a contact force vector $f^{555}$ for a wrench $\omega^{\ddagger}$. To do this, Equation (35) is used to find a feasible contact force vector $\epsilon f$ that resists the external wrench $\omega^{\ddagger} - \omega$. The contact force vector $f + \epsilon f$ is feasible (since the feasible force vectors form a cone), and resists the wrench. This contact force vector can be computed very rapidly. Moreover, if $\omega$ and $\omega^{\ddagger}$ are not too far from each other, the contact force vector $f + \epsilon f$ will be not too suboptimal.

Eighth Embodiment: Contacts Involving Bidirectional Forces

In the above embodiments, the contacts are unidirectional. That is, a contact can impart a normal force only toward the object. In alternative embodiments, one or more contacts may be bidirectional; that is, a normal force may be directed either toward or away from the object. For example, this occurs when suction cups and a vacuum are used on an end effector.

In the general case, there are two classes of forces at a contact point.

(1) Friction-related forces. These are the normal force, directed inward at the surface, and the tangential forces, which are related to the normal forces by the friction cone constraints.

(2) Forces directed outward from contact surfaces. In many applications, these are caused by suction. In other applications, these may be caused by other physical phenomena, such as magnetic attraction.

All contacts have the first class of forces; one or more of the contacts may also have the second class. The present invention can be used to solve the force optimization problem and related problems for situations involving bidirectional forces. The particular case of bidirectional point contact is described below. Other contact models with bidirectional forces may also be used.

An object is subject to a known external wrench $\omega^{ext}$ and contact forces applied at M points on the object. Each contact force consists of a normal force (applied into the object) and a tangential force (whose magnitude does not exceed the coefficient of friction times the normal force). Some of the contacts have an additional outward force that acts in the normal direction, pointing outward. Such contact points are said to be "bidirectional contact points." For convenience of notation, assume that the contacts are indexed so that the first $M_s$ contacts have outward forces. For the other contacts, the outward force is taken to be zero.

Thus, for each contact point there are 4 scalar forces: a normal inward force $f_z$, two tangential forces ($f_x$, $f_y$), and an outward force $f_s$. For the object to be in equilibrium, 6 linear equations in the 4 M variables must be satisfied $$\sum_{i=1,\ldots,M} A_i \begin{bmatrix} f_x^{(i)} \\ f_y^{(i)} \\ f_z^{(i)} - f_s^{(i)} \end{bmatrix} + \omega^{ext} = 0 \qquad (36)$$

The friction cone constrains must hold.

$$\|(f_x^{(i)}, f_y^{(i)})\| \leq \mu f_z^{(i)} \; i=1,\ldots,M$$

Also, the outward forces are constrained to be non-negative $$0 \leq f_s^{(i)} \; i=1,\ldots,M$$

Together, these define a convex set of feasible forces.

The net forces applied at bidirectional contact point i are $$\begin{bmatrix} f_x^{(i)} \\ f_y^{(i)} \\ f_z^{(i)} - f_s^{(i)} \end{bmatrix}$$

Under the two constraints above, these forces may be analyzed as follows. When the outward force is zero, the set of forces that can be applied forms the usual friction cone, which can be visualized in the usual way, with the point of the cone at the contact point, and the centerline of the cone oriented along the inward normal. When the outward force $f_s$ has some fixed positive value, the set of total forces that can be applied at the point forms a convex set. This set is readily visualized as the original friction cone, with centerline oriented along the inward normal direction, but with its point displaced out of the set by the amount $f_s$. This makes it clear that the larger the outward force, the larger the set of possible total forces that can be applied at the point.

A useful property may be observed. It is possible to increase both $f_z^{(i)}$ and $f_s^{(i)}$ by an equal amount, without affecting the net force applied at contact point i, and therefore not affecting force equilibrium. Increasing $f_z^{(i)}$ and $f_s^{(i)}$ improves (i.e., increases the margin in) the friction cone inequalities.

Hence, it is possible to apply any desired net force, at a bidirectional contact point, by using a large enough outward force. Suppose the desired net force at some contact point is ($f_x^{des}$, $f_y^{des}$, $f_z^{des}$). The first step is to set $$f_x = f_x^{des}, f_y = f_y^{des}$$

The remaining choices are made as follows.

(1) If $\|(f_x, f_y)\| \leq \mu f_z^{des}$ then set $$f_z = f_z^{des}, f_s = 0$$

This is the case where an outward force is not required to achieve the desired not contact force.

(2) Otherwise choose $$f_z = \|(f_x, f_y)\|/\mu$$

so the friction cone constraint is (just) satisfied and set $$f_s = f_z - f_z^{des}$$

This insures that $f_s$ is positive. Of course, any larger force $f_s$ may be used, as long as $f_z$ is increased by the same amount. This might be done so that the friction cone constraint holds with some margin.

Force closure is said to occur if any external wrench can be resisted by some choice of contact forces. If all the forces are bidirectional, the question of determining force closure is quite straightforward, with a simple analytic solution: Force closure occurs if and only if there are at least three non-collinear contact points.

This may be seen as follows.

(1) First, suppose that all contact points lie on a line. Then the contact forces cannot resist a torque acting in the plane normal to the line and force closure is not attained.

(2) To show the other direction, suppose there are three non-collinear contact points. Then the contact matrix A has full rank (i.e., 6), so there exists at least one set of net contact forces that achieves equilibrium. Constructively, the least-norm solution may be chosen $$\begin{bmatrix} f_x^{(i)}, \ln \\ f_y^{(i)}, \ln \\ f_z^{(i)}, \ln \end{bmatrix} = A_i \left( \sum_{i=1,\ldots,M} A_i A_i^T \right)^{-1} \omega^{ext}$$

This produces a set of desired net contact forces. To each of these, the method described above is used to find friction and outward forces that meet the constraints and result in the desired net contact force.

In regard to solving a force optimization problem associated with bidirectional forces, several observations may be made. First, certain bidirectional forces are subject to physical limits; e.g. suction force is limited by atmospheric pressure. Second, there are many different optimization problems that may be of interest, depending on the application. Three of these problems are discussed explicitly below; however, the present invention is not limited to these.

The contact forces may be minimized under the constraint that the outward forces for the $M_s$ bidirectional contacts are equal (e.g. if a suction line is shared). Suppose the magnitude of the contact forces is measured by $F^{max} = \max\{\|f^{(1)}\|, \ldots, \|f^{(M)}\|\}$. In this case, the convex optimization problem is the same as Equation (7) with the force equilibrium equation adjusted for the outward forces per Equation (36) and with additional constraints on the outward forces minimize $F^{max}$ subject to $f^{(i)} \in K_i$, $i=1, \ldots M$ $0 \leq f_s^{(i)} = f_s^{(1)}$, $i=1, \ldots M_s$ $0 = f_s^{(i)}$, $i = M_s+1, \ldots, M$      Equation (36)

Alternatively, the problem may be formulated as having a mixed objective. Suppose the magnitude of the contact forces is measured by $F^{max} = \max\{\|f^{(1)}\|, \ldots, \|f^{(M)}\|\}$. Suppose the magnitude of the outward forces is measured by $F^s = \max\{\|f_s^{(1)}\|, \ldots, \|f_s^{(M_s)}\|\}$. Let the scalar $\lambda$ express the trade-off between contact force and outward force. The convex optimization problem is minimize $F^{max} + \lambda F^s$ subject to $f^{(i)} \in K_i$, $i=1, \ldots M$      Equation (36)

$0 \leq f_s^{(i)}$, $i=1, \ldots, M_s$ $0 = f_s^{(i)}$, $i = M_s+1, \ldots, M$

It is also possible to minimize the contact force subject to the constraint that the outward force is limited to some value $F_s^{lim}$ minimize $F^{max}$ subject to $f^{(i)} \in K_i$, $i=1, \ldots M$ $0 \leq f_s^{(i)} \leq F_s^{lim}$, $i=1, \ldots M_s$ $0 f_s^{(i)}$, $i = M_s+1, \ldots, M$      Equation (36)

The present invention may be used to solve these and other related convex optimization problems involving bidirectional contact forces, using the methods described herein.

Alternative Embodiments and Implementations

The invention has been described above with reference to certain embodiments and implementations. Various alternative embodiments and implementations are set forth below. It will be recognized that the following discussion is intended as illustrative rather than limiting.

There are many alternative embodiments of the present invention. Choice among them depends on several factors, including the application.

Alternative Measures of Force

In the above embodiments, size of a set of contact forces is measured as the maximum of their magnitudes.

$$F^{max} = \max\{\|f^{(1)}\|, \ldots, \|f^{(M)}\|\}$$

This is used as the objective in the minimization. In alternative embodiments, other objectives may be used.

Some possible other objectives in the force optimization problem (FOP) are as follows:

(1) The sum of squares of the force magnitudes, $$F^{sumsq} = \|f^{(1)}\|^2 + \ldots + \|f^{(M)}\|^2.$$

(2) The sum of the force magnitudes, $$F^{sum} \|f^{(1)}\| + \ldots + \|f^{(M)}\|.$$

(3) The maximum normal force, $$F^{normmax} = \max \{f_z^{(1)}, \ldots, f_z^{(M)}\}.$$

Observe that the force feasibility problem does not depend on the measure used to assess the size of a set of contact forces. That is, it does not depend on the above objective in the force optimization problem. Hence, the method described in the first embodiment to compute a feasible contact force vector may be used directly for all of the above force feasibility problems.

In regard to the force optimization problem, observe that each of the above objectives results in a new conic formulation of the problem and a new dual problem. However, the problem and its dual are similar to that for $F^{max}$. Also, the log barrier function, the dual residual, and the Hessian are similar. The same structure for the KKT coefficient matrix, however, will occur in all cases (possibly after elimination of some variables). This means that the present invention can be used to solve each of these problems efficiently.

This may be illustrated using the objective $F^{sumsq}$. Observe that it is entirely equivalent to minimize the square root of $F^{sumsq}$. This leads to the second-order cone problem minimize F subject to $(f,F) \in K$, $f^{(i)} \in K_i$, i=1,... M, $Af + \omega^{ext} = 0$, (37)

with variables $F \in R$ and $f \in R^{3M}$. Here K denotes the standard second-order cone in $R^{3M+1}$, $$K = \{(z, y) \in R^{3M} \times R | \|z\| \leq y\}.$$

The only difference between this problem and the FOP of Equation (8) is that the M cone constraints $(f^{(i)}, F) \in K$, i=1,...,M (where K is the standard second-order cone in $R^4$) are replaced with the single cone constraint $(f,F) \in K$ (where K is the standard second-order cone in $R^{3M+1}$).

Following the methods used to derive Equation (13), the dual problem is maximize $v^T \omega^{ext}$ subject to $z_i \Sigma K_i^*$, i=1,... M $\Sigma$ i=1,...,M $\|A_i^T v - z_i\|^2 \leq 1$ which is the analog of Equation (13). Indeed, the only difference between this dual and the dual of Equation (13) is that sum of norms constraint in the dual of Equation (13) becomes a sum of norms squared constraint here. The explicit dual, the analog of Equation (14), may be written as maximize $v^T \omega^{ext}$ subject to $\Sigma$ i=1,...,M $\|A_i^T v, K_i^*)^2 \leq 1$ Again, the only difference is in the presence of the square.

The barrier function for the optimization problem of Equation (37) is given by $\phi(f,F) = -\log(F^2 - \|f\|^2) - \Sigma$ i=1,...,M log $(\mu_i^2 f_z^{(i)2} - f_x^{(i)2} - f_y^{(i)2})$, The matrix appearing in the KKT system that defines the Newton step in fact is fully dense. However, closer examination reveals that the Hessian term contributed by the second term of the barrier is block diagonal, with 3×3 blocks, and the Hessian term contributed by the first block is actually diagonal plus rank one. Using an un-elimination step (e.g. as described in Appendix C of Boyd and Vandenberghe, *Convex Optimization*, supra.) a set of linear equations may be obtained with the structure as Equation (22).

Force Limits

In the above embodiments, the goal is to minimize force according to some measure. In alternative embodiments, additional constraints on force may also be considered. The present invention can be used to solve the force optimization problem and the related force feasibility problem where there are force limits.

An example will illustrate how this is done. Suppose that some of the contact forces are limited by a fixed upper bound, e.g. that imposed by the actuation mechanism. Among those contact force vectors that satisfy these bounds, the optimal one is to be selected that meets some other criterion.

Specifically, suppose that L of the contact forces have specified limits on their z-component. By reordering, these may be made to have the low order indices, so that the additional constraints are $f_z^{(i)} \leq L_i$, i=1,...,L Suppose that the objective criterion is to minimize the sum of the squares of the contact forces. That is, the objective is $F^{sumsq}$. The situation is similar to the prior alternative embodiment. The force optimization problem for this case can be expressed as the following second-order cone problem minimize F subject to $(f,F) \in K$, $f^{(i)} \in K_i$, i=1,... M, $Af + \omega^{ext} = 0$ $f_z^{(i)} \leq L_i$, i=1,...,L The barrier sub-problem is the same, with a suitable choice of log barrier. That is given by $$\Phi(f, F) = -\log(F^2 - \|f\|^2) - \sum_{i=1,\ldots,M} \log(\mu_i^2 f_z^{(i)2} - f_x^{(i)2} - f_y^{(i)2})$$

$-\Sigma$ i=1,...,L log$(L_i - f_z^{(i)})$

The additional constraints add L-log terms to the barrier. Correspondingly, additional terms are added to the dual residuals and to the Hessian. The structure of the Hessian is the same as that of the prior FOP that uses the $F^{sumsq}$ objective. Hence, the present invention may be used to solve this force optimization problem.

The associated force feasibility problem (FFP) is modified to account for the additional constraints on forces. A second-order cone formulation is minimize s subject to $f^{(i)} + se_3 \in K_i$, i=1,... M, $-1 \leq s$ $Af + \omega^{ext} = 0$ $f_z^{(i)} \leq l_i + s$ i=1,..., L Here, the variable s, which is the objective in the FFP, can be interpreted as a fictitious force added to each of the normal forces for the purpose of satisfying the friction cone constraint but subtracted from some of the normal forces for the purpose of satisfying the force limits. The goal of the minimization is to drive the fictitious force s to become zero (or negative). If this is successful, then each of the M friction cones is satisfied with margin s and each of the L force limits is satisfied with margin s. On the other hand, if the optimal value of s is positive, it means that the FOP is infeasible. The constraints of the force limits can readily cause this to occur, e.g., if the force limits are inconsistent with the external wrench.

The log barrier for the associated barrier sub-problem is similar to (FFP-LB). The force limits simply add L terms of the form $-\log(L_i + s - f_z^{(i)})$. The dual residuals and the Hessian are accordingly modified. The structure of the Hessian is unchanged. Hence, the present invention may be used to solve this force feasibility problem.

Alternative Friction Models

In above embodiments, the model of contact is point contact with friction. In alternative embodiments, other models of friction may be used.

For example, an alternative embodiment may use a soft contact model. In this model, the contact points can exert a torque, about the local z-axis (i.e., normal axis), as well as a force. Hence, a normal contact torque, $f_t^{(i)} \in R$, is introduced as the fourth component of the ith contact point force $f^{(i)}$, for $i=1, \ldots, M$. The contact force vector, f, is correspondingly redefined to include these contact torques as every fourth component. The corresponding coefficient of torsional friction is denoted by $\sigma_i$. In this case the ith contact matrix $A_i$ becomes 6×4, with a fourth column that includes the effect of the torques applied in the normal direction at each contact point. The equilibrium condition is still $A f + \omega^{ext} = 0$, with these new definitions of f and A. The ith friction cone, now in $R^4$, has the form $$K_i \{ x \in R^4 | ((x_1^2 + x_2^2)/\mu_i^2 + X_4^2/\sigma_i)^{1/2} \leq x_3 \},$$

Note that here $x_3$ represents the normal force, $(x_1, x_2)$ the tangential friction force, and $X_4$ the friction torque.

With these new definitions of $f \in R^{4M}$, $A \in R^{6 \times 4M}$, and $K_i \subseteq R^4$, and assuming the size of a set of contact forces is measured by the maximum magnitude of the contact forces (and torque), the FOP is unchanged. It has the form of Equation (7). The dual is also identical, with the dual of the soft contact friction cone $$K_i^* \{ y \in R^4 | ((y_1^2 + y_2^2) \mu_i^2 + y_4^2 \sigma_i^2)^{1/2} \leq y_3 \},$$

The dual problem is the same. The only change is in the computation of the Euclidean distance to $K_i^*$.

The barrier method is the same, with suitable modification to the barrier function. The KKT system for the barrier sub-problem has the same general form, except that the diagonal blocks are 4×4, instead of 3×3. Otherwise, the situation is the same.

Alternative Convex Optimization Problems

The above embodiments formulate the force optimization problem as a second-order cone problem. Alternative embodiments may formulate the force optimization problem as other convex problems. For example a semi-definite program (SDP) formulation may be used. A barrier subproblem can be formed for a SDP, as described in Boyd and Vandenberghe, *Convex Optimization*, supra., and the present invention can be employed.

Alternative Interior Point Methods

The above embodiments use a primal solution method for the barrier sub-problem. Alternative embodiments may employ other interior methods, for example a primal-dual interior-point method. When a primal-dual method is used, various aspects of the present invention may be employed. For example, the block elimination method may be used in its solution.

Other Solution Methods

The first and second embodiments solve the barrier subproblem using a Newton method. In alternative embodiments, the barrier subproblem may be solved by alternative techniques. These include quasi-Newton methods, Broyden-Fletcher-Goldfarb-Shanno (BFSG) methods, gradient methods, and conjugate gradient methods.

Infeasible Starting Points

The first and second embodiments employ two phases: Phase 1 finds a feasible solution (or determines that the problem is infeasible) and Phase 2 starts with the feasible solution to find an optimal solution. Alternative embodiments may omit Phase 1 and use only Phase 2 as described in the first or second embodiments. Such embodiments construct a starting point that strictly satisfies the cone constraints, but is not necessarily feasible. This is readily done; a contact force vector with only positive normal forces meets this criterion. Given such a starting point, the Phase 2 procedure described above will eventually converge.

Schedule for the Accuracy Parameter t

In the first embodiment, the accuracy parameter t is fixed. In alternative embodiments, the accuracy parameter t may be varied. Several techniques for varying t may be used. One technique (as described in Boyd and Vandenberghe, *Convex Optimization*, supra.) is to solve the barrier subproblem to convergence, multiply t by a fixed factor, solve the new subproblem and repeat this until a subproblem is solved with a sufficiently large value of t. Another technique is to execute a single Newton iteration, multiply t by a fixed factor, repeat this some number of times, then solve the barrier subproblem to convergence. Another technique is to execute multiple Newton iterations with the value of t chosen each time based on some function.

Termination of the Newton Method

In the first embodiment, the Newton method is terminated when the duality gap is smaller than an absolute tolerance; in the second embodiment, the Newton method is terminated when of the ratio of duality gap to the dual objective value is smaller than a relative tolerance. In alternative embodiments, the Newton method may be terminated based on other criteria. For example, the Newton method may be run for a fixed number of iterations. Alternatively, the Newton method may be run until some function of the Newton step (e.g., its norm) is less than a specified tolerance.

Warm Start

In the third embodiment, the immediately prior contact force vector $f^{prior}$ is maintained and used as the starting point in a warm-start method. In alternative embodiments, multiple prior contact force vectors may be maintained. Let $\rho$ be the vector of the relevant problem data. In the general case, $\rho = (\omega^{ext}, A, \mu)$. An alternative embodiment may maintain a set $\{\rho_i, f_i^{prior}\}$. Suppose a new FOP is to be solved, with problem data $\rho$. The alternative embodiment chooses a value of k such that $\rho_k$ is close to $\rho$. The associated prior contact force vector $f_k^{Prior}$ is used as the starting point for Newton's method.

Implementation of Procedural Steps

The procedural steps of the several embodiments have been described above. These steps may be implemented in a variety of programming languages, such as C++, C, Java, Ada, Fortran, or any other general-purpose programming language. These implementations may be compiled into the machine language of a particular computer or they may be interpreted. They may also be implemented in the assembly language or the machine language of a particular computer. The method may be implemented on a computer, and executing program instructions may be stored on a computer-readable medium.

The procedural steps may also be implemented in specialized programmable processors. Examples of such specialized hardware include digital signal processors (DSPs), graphics processors (GPUs), media processors, and streaming processors.

The procedural steps may also be implemented in electronic hardware designed for this task. In particular, integrated circuits may be used. Examples of integrated circuit technologies that may be used include Field Programmable Gate Arrays (FPGAs), gate arrays, standard cell, and full custom.

Implementations using any of the methods described in the present invention disclosure may carry out some of the procedural steps in parallel rather than serially.

Application to Robotic Grasping

The present invention has practical applications to robotic grasping. The first and second embodiments may be used in the control of a robotic hand to determine the force to be applied at each contact point. (In typical hands, the contact points are the fingers, but additional contact points can be used in certain robotic hands.). Choice of optimal forces is important for very practical reasons: unbalanced or overly small forces will allow the grasped object to slip out of the hand; overly large forces will exert unnecessary pressure and may crush the object.

The fourth embodiment (which uses the third) can be used to find a desirable location at which to grasp an object. An object can be grasped at many possible locations, but a poor choice will require overly large forces. When the object is irregular in shape or adjacent to obstacles that block possible grasps, finding a good choice requires complex search. The fourth embodiment has the very practical property that it allows a large number of possible configurations to be tried in the search process.

The fifth embodiment can be used to find the maximum contact force that is required to retain an object while it is moved along a trajectory. Two trajectories of great practical interest are (1) rotation, where the external force due to gravity is rotated and (2) rapid movement, where the external wrench includes a significant component due to acceleration. If that maximum force computed by the fifth embodiment is too large, e.g., due to limitations on the force that the hand can apply or limitations on the force the object can withstand, then another grasp configuration must be chosen.

The sixth embodiment can be used to test for form closure. If a grasp has form closure, then the seventh embodiment can be used to find a conservative contact force vector for any external wrench. After the initial preprocessing phase, this can be done very rapidly for each external wrench. This can be used to find a conservative estimate of the maximum contact force over a trajectory very quickly. The conservative estimate can be used to find a near-optimal grasp configuration, by embedding this computation in an outer search loop.

Hence, it will be seen that the optimization techniques disclosed in the present invention have specific and definite practical applications to robotic grasping.

Application to Grasping with Cooperating Manipulators

Grasping with cooperating manipulators is similar to grasping with a single robotic hand. Compared to grasping with a single robotic hand, two differences should be noted.

First, the size of the object to be grasped is usually larger. Hence, the external wrench and the contact forces to restrain it are typically larger. Because of the larger forces, choosing an optimal set of grasping forces is even more important.

Second, there are more contact points. If there are two manipulators, then there are twice as many contact points. Because of the larger number of contacts points, an optimization technique than scales well with their number is even more important.

Hence, it will be seen that the optimality and speed of the techniques disclosed in the present invention have specific and definite practical application.

Application to Multi-Legged and other Actively Coordinated Vehicles

An actively coordinated vehicle has multiple controlled points that contact the terrain. This includes legged walking machines and variably configured wheeled systems. Force distribution is an important issue in controlling such vehicles. The forces much be kept within the friction cones so as to avoid slipping. In some cases, the maximum vertical load must be limited, due to mechanical limitations of the vehicle; in other cases, the ground loading is a limit. The first and second embodiments of the present invention may be used in the control of an actively coordinated vehicle to determine the force to be applied at each leg or wheel.

Additionally, the warm-start method of the third embodiment can be used in the control of legged vehicles. A specific example will illustrate this. Suppose a legged vehicle has 4 legs. During the gait cycle, the number of legs in contact with the ground switches from 4 to 3, back to 4, and so forth. When a leg is goes from contact to non-contact, or from non-contact to contact, it is desirable for the force applied by that leg to vary smoothly over an interval of time. Hence, during that interval, the force is specified (as a smooth function from 0, when out of contact, to some optimal force when in full contact). The total external wrench is then the sum of the gravity wrench and the specified leg wrench. This creates a trajectory in wrench space in which the wrench varies smoothly and relatively slowly. The force distribution problem is solved for the other legs at each point in time. The warm-start method of the third embodiment can be used advantageously to do this.

Application to Humanoid Robots

Consider a humanoid robot with two legs where the foot of each leg can be controlled with multiple degrees of freedom. For example, a separately articulated toe provides an additional degree of freedom. If each foot has sufficient degrees of freedom, the system can be treated in a way similar to a multi-legged vehicle as described above. The present invention may be used in the control of a humanoid robot determine the force by each of the ground contact actuators.

Other Applications

The invention has been described in the context of robotics. The invention is not limited to these applications and this field of applications. The present invention can also be applied to other situations involving contact forces. It will be recognized that this list is intended as illustrative rather than limiting and the invention can be utilized for varied purposes.

CONCLUSION, RAMIFICATIONS, AND SCOPE

In summary, the invention disclosed herein provides a method for solving the force optimization problem and related problems that is substantially faster than a general-purpose solver for second-order programs. Its termination is entirely nonheuristic. When the problem is feasible, the method terminates with a provable bound on the suboptimality of the computed contact forces. When the problem is infeasible, the method terminates with a certificate proving infeasibility of the problem.

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for solving a force feasibility problem, which is the problem of determining whether it is possible to choose contact forces to be applied at a set of specified contact points to restrain an object against a specified external wrench, comprising the steps of:
    (a) formulating the problem of determining whether it is possible to choose contact forces to be applied at a set of specified contact points on an object to resist a specified external wrench as a convex optimization problem;
    (b) formulating a primal barrier subproblem associated with the convex optimization problem where the primal barrier subproblem has an accuracy parameter; and
    (c) solving the primal barrier subproblem for a fixed value of the accuracy parameter.

2. The method of claim 1, where the convex optimization problem is a second-order cone program.

3. A method for solving a force feasibility problem, which is the problem of determining whether it is possible to choose contact forces to be applied at a set of specified contact points to restrain an object against a specified external wrench, comprising the steps of:
    (a) formulating the problem of determining whether it is possible to choose contact forces to be applied at a set of specified contact points on an object to resist a specified external wrench, as a convex optimization problem;
    (b) formulating a primal barrier subproblem associated with the convex optimization problem;
    (c) formulating a dual problem having a dual objective such that if the dual problem is satisfied, it is not possible to choose such forces; and
    (d) solving the primal barrier subproblem, using the dual objective in a convergence test.

4. The method of claim 3, where the step of solving the primal barrier subproblem further comprises expressing the dual objective by an explicit formula.

5. A method for solving a force optimization problem, which is the problem of computing optimal contact forces to be applied at a set of specified contact points to restrain an object against a specified external wrench, comprising the steps of:
    (a) formulating the problem of computing optimal contact forces to be applied at a set of specified contact points to restrain an object against a specified external wrench as a convex optimization problem;
    (b) formulating a primal barrier subproblem associated with the convex optimization problem where the primal barrier subproblem has an accuracy parameter; and
    (c) solving the primal barrier subproblem for a fixed value of the accuracy parameter.

6. The method of claim 5, where the convex optimization problem is a second-order cone program.

7. A method for solving a force optimization problem, which is the problem of computing optimal contact forces to be applied at a set of specified contact points to restrain an object against a specified external wrench, comprising the steps of:
    (a) formulating the problem of computing optimal contact forces to be applied at a set of specified contact points to restrain an object against a specified external wrench, as a convex optimization problem;
    (b) formulating a primal barrier subproblem associated with the convex optimization problem;
    (c) formulating a dual problem having a dual objective; and
    (d) solving the primal barrier subproblem, using the dual objective in a convergence test.

8. The method of claim 7, where the step of solving the primal barrier subproblem further comprises computing the dual objective by an explicit formula.

9. A method solving a force optimization problem, which is the problem of computing optimal contact forces to be applied at a set of specified contact points to restrain an object against a specified external wrench, comprising the steps of:
    (a) formulating the problem of computing optimal contact forces to be applied at a set of specified contact points to restrain an object against a specified external wrench, as a convex optimization problem;
    (b) formulating a primal barrier subproblem associated with the convex optimization problem where the primal barrier subproblem has an accuracy parameter, and
    (c) solving the primal barrier subproblem to a guaranteed relative tolerance.

10. The method of claim 9, where the step of solving the primal barrier subproblem to a guaranteed relative tolerance further comprises computing a dual objective.

11. A method for solving a force optimization problem, which is the problem of computing optimal contact forces to be applied at a set of specified contact points to restrain an object against a specified external wrench, comprising the steps of:
    (a) formulating the problem of computing optimal contact forces to be applied at a set of specified contact points to restrain an object against a specified external wrench, as a convex optimization problem;
    (b) constructing a system of linear equations associated with the convex optimization problem; and
    (c) solving the system of linear equations using a custom block elimination method.

12. The method of claim 11, where the system of linear equation includes primal variables associated with contact force at contact points and dual variables, and where the custom block elimination method comprises the steps of:
    (a) eliminating one or more of the primal variables by symbolic substitution;

(b) solving for the dual variables; and (c) solving for the eliminated primal variables.

13. The method of claim 12, where the convex optimization problem is a second-order cone program.

14. A method for solving a set of force optimization problems, each problem in the set being that of computing optimal contact forces to be applied at a set of specified contact points to restrain an object against a specified external wrench, comprising the steps of:

(a) formulating the set of force optimization problems as a set of convex optimization problems;

(b) solving one or more of the convex optimization problems in the set so that a solution state is obtained for each solved convex optimization problem;

(c) retaining one or more of the solution states; and (d) using one of the retained solution states as a starting point in solving subsequent convex optimization problems in the set.

15. The method of claim 14, where the convex optimization problems are solved via a primal barrier method.

16. The method of claim 15, where the primal barrier method includes an infeasible start Newton method.

17. The method of claim 14, where each force optimization problem has a set of contact points which may be different from the contact points of the other force optimization problems, and an external wrench which is common to all of the force optimization problems.

18. The method of claim 14, where each force optimization problem has a set of contact points which is common to all of the force optimization problems and an external wrench which may be different from the external wrenches of the other force optimization problems.

19. The method of claim 14, where one or more of the convex optimization problems of the set is a second-order cone program.

20. A method for determining the minimum force required to satisfy any of a set of force optimization problems, each problem in the set being that of computing optimal contact forces to be applied at a set of specified contact points to restrain an object against a specified external wrench, comprising the steps of:

(a) formulating each force optimization problem as a convex optimization problem;

(b) solving one of the convex optimization problems;

(c) retaining a best-case minimum value over the set of problems solved;

(d) solving other convex optimization problems;

(e) updating the best-case minimum value if the solution of any convex optimization problem produces a force smaller than the prior best-case minimum value; and (f) terminating the solution of one or more of the convex optimization problems if the minimum force for a convex optimization problem can be demonstrated to be larger than the best-case minimum value.

21. The method of claim 20, where the minimum force for a problem is demonstrated to be larger than the best-case minimum value by evaluating a dual objective.

22. The method of claim 20, where the solution method uses a warm-start method.

23. The method of claim 20, where each force optimization problem has a set of contact points which may be different from the contact points of the other force optimization problems, and an external wrench which is common to all of the force optimization problems.

24. The method of claim 20, where one or more of the convex optimization problems is a second-order cone program.

25. A method for determining the maximum force required to solve each of a set of force optimization problems, each problem in the set being that of computing optimal contact forces to be applied at a set of specified contact points to restrain an object against a specified external wrench, comprising the steps of:

(a) formulating each force optimization problem as a convex optimization problem;

(b) solving one of the convex optimization problems;

(c) retaining a worst-case maximum value over the set of problems solved;

(d) solving other convex optimization problems;

(e) updating the worst-case maximum value if a solution to a convex optimization problem produces a force larger than the prior worst-case maximum value; and (f) terminating the solution of one or more of the convex optimization problems if the minimum force for a convex optimization problem can be demonstrated to be smaller than the worst-case maximum value.

26. The method of claim 25, where the minimum force for a convex optimization problem is demonstrated to be smaller than the worst-case maximum value by evaluating a primal objective.

27. The method of claim 25, where the solution method uses a warm-start method.

28. The method of claim 25, where each force optimization problem has a set of contact points which is common to all of the force optimization problems and an external wrench which may be different from the external wrenches of the other force optimization problems.

29. The method of claim 25, where one or more of the convex optimization problems is a second-order cone program.

30. A method for solving a force closure problem, which is the problem of determining whether it is possible to choose contact forces to be applied at a set of specified contact points on an object to resist arbitrary external wrenches, each external wrench corresponding to a choice of forces, comprising the steps of (a) computing a set of wrenches having a convex hull with an interior, such that the origin is in the interior of the convex hull;

(b) forming, for each wrench in the set of wrenches, a problem of determining whether it is possible to choose contact forces to be applied at a set of specified contact points on the object to resist the specified external wrench; and (c) determining whether each of the problems is feasible.

31. The method of claim 30, where the set of wrenches consists of 7 wrenches.

32. A method for computing a conservative contact force vector for any of a set of external wrenches, comprising the steps of:

(a) computing a set of base contact force vectors that are independent of the external wrenches, and (b) computing a conservative contact force vector for any external wrench as a linear combination of the base contact force vectors.

33. The method of claim 32, where the set of base contact force vectors consists of 12 vectors.

34. The method of claim 33, where the coefficients in the linear combination are the positive and negative components of the new external wrench.

35. A method for solving a force optimization problem with bidirectional forces, which is the problem of computing optimal bidirectional contact forces to be applied at a set of specified contact points to restrain an object against a specified external wrench, comprising the steps of:
  (a) formulating the force optimization problem of computing optimal bidirectional contact forces to be applied at a set of specified contact points to restrain the object against the specified external wrench as a convex optimization problem involving two classes of forces, the first class of forces being friction-related forces and the second class of forces being forces directed outward from contact surfaces;
  (b) formulating a primal barrier subproblem associated with the convex optimization problem; and
  (c) solving the primal barrier subproblem.

36. The method of claim 35, where the convex optimization problem includes equality constraints requiring that each force of the second class either be zero or equal to the other non-zero forces of the second class.

37. The method of claim 35, where the convex optimization problem involves a trade-off between the first class of forces and the second class of forces.

38. The method of claim 35, where the convex optimization problem includes inequality constraints requiring that that each force of the second class be no larger than some fixed value.

* * * * *